(12) United States Patent
Akao et al.

(10) Patent No.: US 8,300,115 B2
(45) Date of Patent: Oct. 30, 2012

(54) IMAGE PROCESSING APPARATUS, IMAGE PROCESSING METHOD, AND PROGRAM

(75) Inventors: Masato Akao, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 623 days.

(21) Appl. No.: 12/434,019

(22) Filed: May 1, 2009

(65) Prior Publication Data

US 2009/0284619 A1 Nov. 19, 2009

(30) Foreign Application Priority Data

May 14, 2008 (JP) ................................ 2008-126958

(51) Int. Cl.
*H04N 5/228* (2006.01)
*G09G 5/00* (2006.01)
*G06F 3/048* (2006.01)

(52) U.S. Cl. ..................... 348/222.1; 345/581; 345/619; 715/803

(58) Field of Classification Search ............... 348/222.1; 345/418–475; 715/803
See application file for complete search history.

(56) References Cited

U.S. PATENT DOCUMENTS

| 7,027,181 B2 * | 4/2006 | Takamori | 358/1.6 |
| 2007/0297677 A1 * | 12/2007 | Machimura et al. | 382/190 |
| 2008/0043031 A1 * | 2/2008 | Jagmag | 345/581 |

FOREIGN PATENT DOCUMENTS

| JP | 60-14571 | 1/1985 |
| JP | 11-136528 | 5/1999 |
| JP | 2001-78192 | 3/2001 |
| JP | 2003-202944 | 7/2003 |
| JP | 2005-18535 | 1/2005 |
| JP | 2007-235572 | 9/2007 |
| JP | 2008-15632 | 1/2008 |
| JP | 2008-97141 | 4/2008 |

\* cited by examiner

*Primary Examiner* — Sinh Tran
*Assistant Examiner* — Mark Monk
(74) *Attorney, Agent, or Firm* — Oblon, Spivak, McClelland, Maier & Neustadt, L.L.P.

(57) ABSTRACT

An image processing apparatus includes a generation unit for generating a plurality of different values for one parameter of a processing applied on an image, a presentation unit for presenting a plurality of processing images obtained by performing a processing on the image with the plurality of different values for the parameter, and a selection unit for selecting an optimal one of the plurality of presented processing images, in which a final value for the parameter is decided by repeatedly performing such a procedure that the generation unit further generates different values for the parameter on the basis of a value for the parameter corresponding to the selected processing image, the presentation unit presents processing images obtained by performing a processing on the image with the generated different values for the parameter, and the selection unit selects an optimal one of the presented processing images.

5 Claims, 26 Drawing Sheets

| SETTING INFORMATION IDENTIFICATION NUMBER | SETTING INFORMATION TYPE |
|---|---|
| 1 | ZOOM IMAGE FRAME |
| 2 | LUMINANCE |
| 3 | COLOR DEPTH |
| 4 | COLOR SHADE |
| 5 | NOISE REDUCTION |
| 6 | RESOLUTION |
| 7 | AUDIO FILTER |
| ... | ... |

| CANDIDATE VALUE NUMBER 1 | ZOOM CENTER COORDINATE (300, 600) | ZOOM FACTOR 150% |
|---|---|---|
| CANDIDATE VALUE NUMBER 2 | ZOOM CENTER COORDINATE (300, 600) | ZOOM FACTOR 200% |
| CANDIDATE VALUE NUMBER 3 | ZOOM CENTER COORDINATE (300, 600) | ZOOM FACTOR 250% |
| CANDIDATE VALUE NUMBER 4 | ZOOM CENTER COORDINATE (300, 600) | ZOOM FACTOR 300% |

FIG. 23
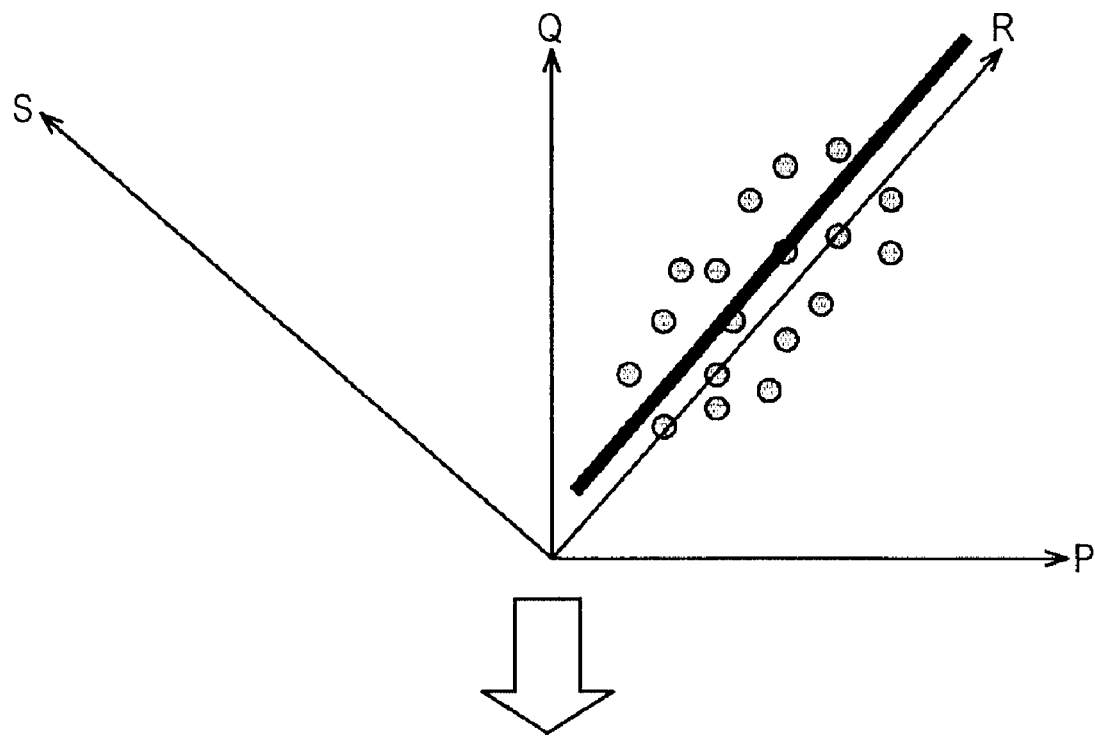
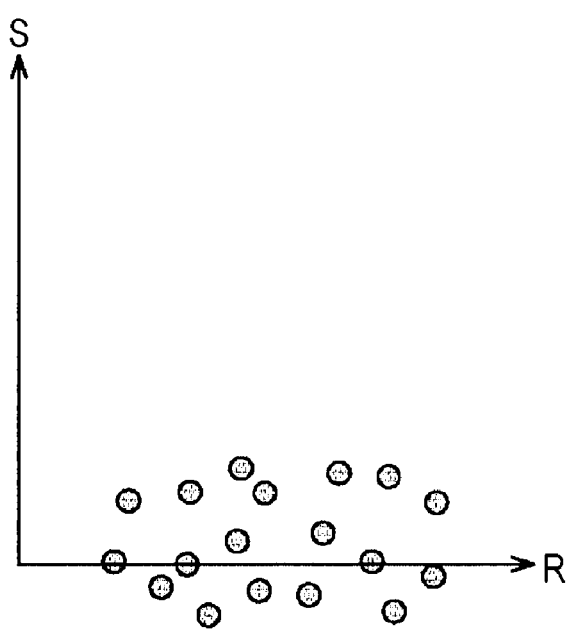

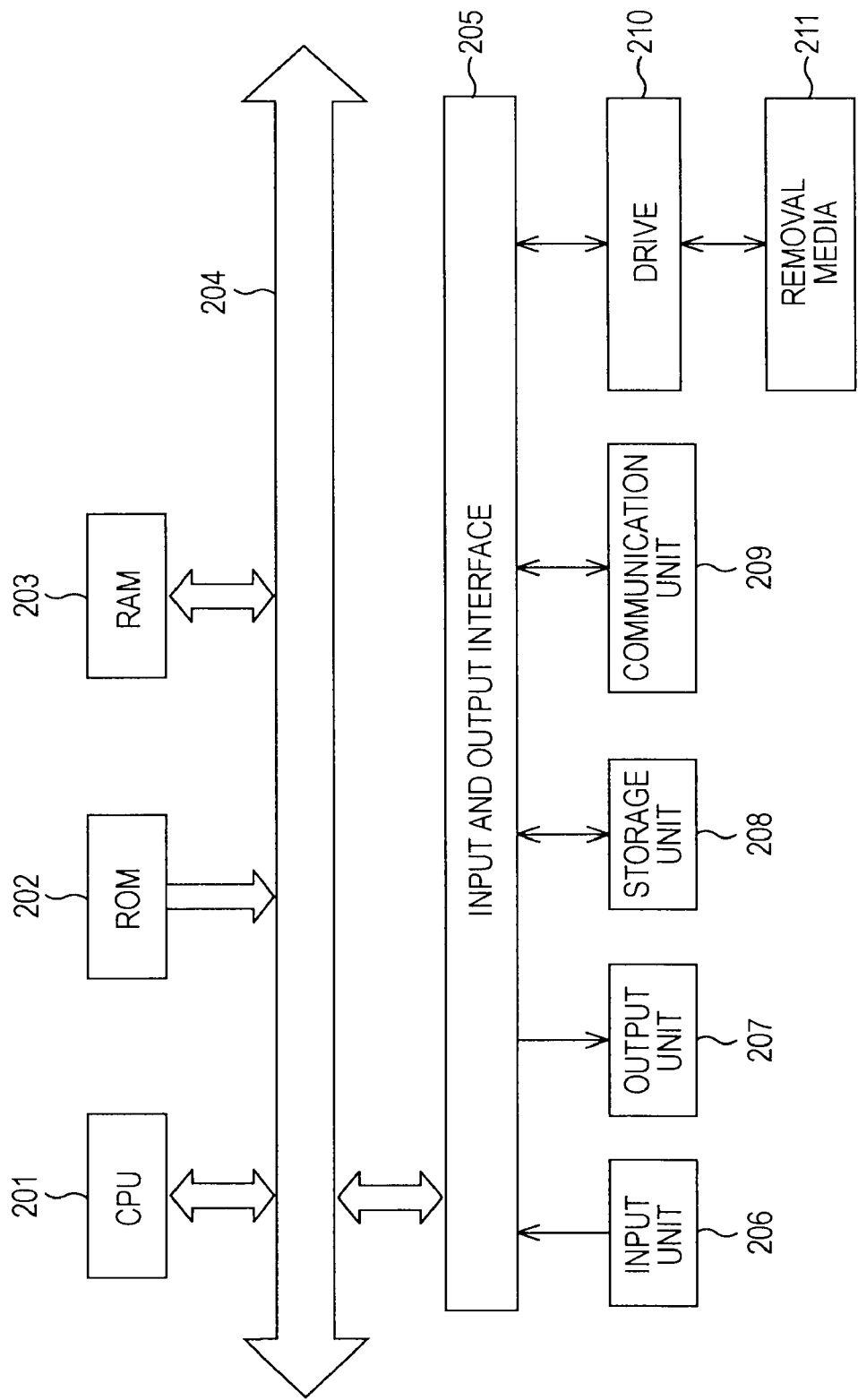

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program, in particular, the invention relates to an image processing apparatus, an image processing method, and a program in which it is possible to decide an optimal parameter used when a processing is applied on an image by way of a simple operation with a small storage amount.

2. Description of the Related Art

Up to now, in a case where an image captured by a video camera or the like is edited, a linear editing is utilized in which operations for applying various processings are executed while image data of an original image is reproduced, and an image which is a result of the processing is recorded in another recording medium.

According to the method in a related art, the editing operation is carried out while the original image data is reproduced, and it is therefore difficult to perform a complex processing on the image. On the other hand, an editing apparatus is proposed in which editing operations are decided offline to be tagged with time codes, and the editing processings are applied mechanically in accordance with the time codes in a final stage. However, this case causes a problem that the procedure is complicated. Therefore, in the related art, it is also difficult to realize an apparatus capable of performing a complicated processing by way of a simple operation (procedure).

Also, in a case where the data of the original image is COPY ONCE, there is a problem that data recorded on the recording media once is reproduced, and the video subjected to a further editing is not allowed to be recorded. In order to cope with this problem, a method of storing an operation for instructing a processing for editing the image is proposed (for example, see Japanese Unexamined Patent Application Publication No. 2003-202944).

Up to now, with regard to an image editing, such an editing is generally used that a plurality of materials (video clips) of images captured at different locations are combined to produce one content. In recent years, with a development in a digital image processing technology, like a plurality of spatial cutouts from one material (for example, zooming), an editing for processing on the one material from a plurality of view points is being carried out.

FIG. 1 is an explanatory diagram for describing an image processing apparatus in a related art (image editing apparatus) configured to perform a zoom processing (enlargement processing) with different zoom factors with respect to one material.

An image processing apparatus 1 in the related art temporarily stores processing images which are results of an original image reproduced from a recording media which has been subjected to a zoom processing with different zoom factors in a memory 1M within the image processing apparatus 1. Then, the plurality of stored processing images are sequentially checked by a user to decide a finally adopted zoom factor, and the images are displayed as presentation images.

SUMMARY OF THE INVENTION

Therefore, in the image processing apparatus 1 in the related art, all the processing images processed with the respective candidate parameters are stored in order to decide an optimal parameter, and some extent of memory volume is prepared in the image processing apparatus 1. In addition, the decision is made after temporarily storing all the candidate processing images and sequentially reading out the images, and this method is not suitable to an editing in which processing is carried out in an interactive manner.

The present invention has been made in view of the above-mentioned circumstances, and it is desirably to decide an optimal parameter used when an image is processed by way of a simple operation with a small storage amount.

According to an embodiment of the present invention, there is provided an image processing apparatus including: a generation unit configured to generate a plurality of different values for one parameter of a processing applied on an image; a presentation unit configured to present a plurality of processing images obtained by performing a processing on the image with the plurality of different values for the parameter; and a selection unit configured to select an optimal one of the plurality of presented processing images, in which a final value for the parameter is decided by repeatedly performing such a procedure that the generation unit further generates a plurality of different values for the parameter on the basis of a value for the parameter corresponding to the processing image selected by the selection unit, the presentation unit presents a plurality of processing images obtained by performing a processing on the image with the plurality of generated different values for the parameter, and the selection unit selects an optimal one of the plurality of presented processing images.

In the image processing apparatus, according to a further embodiment of the present invention, in a case where the number of presentations of the processing images is n, the generation unit may set values at borders obtained dividing a predetermined range into n−1 equal parts while using the value for the parameter corresponding to the processing image selected by the selection unit as a center value, as a plurality of different values for the new parameter.

In the image processing apparatus, according to a further embodiment of the present invention, the generation unit may generate plural types of the parameters and change an order of generating the plural types of the parameters in accordance with a tendency of a past operation procedure carried out by a user.

The image processing apparatus according to a further embodiment of the present invention may further include a characteristic amount extraction unit configured to extract a characteristic amount of the image and a storage unit configured to store the decided final value for the parameter as setting information while associating the setting information with the characteristic amount of the image.

The image processing apparatus according to a further embodiment of the present invention may further include setting information reading unit configured to read the setting information stored while being associated with the extracted characteristic amount of the image from the storage unit, in which the image processing apparatus has a recording mode and a reproduction mode, in the recording mode, the storage unit stores setting information while being associated with the characteristic amount of the image, and in the reproduction mode, the characteristic amount extraction unit extracts the characteristic amount of the image, the setting information reading unit reads the setting information stored while being associated with the extracted characteristic amount of the image from the storage unit, and the presentation unit presents the processing images obtained by performing a processing on the image by using the read setting information.

According to another embodiment of the present invention, there is provided an image processing method for an image processing apparatus including a generation unit, a presentation unit, and a selection unit, the image processing method including: generating a plurality of different values for one parameter of a processing applied on an image in the generation unit; presenting a plurality of processing images obtained by performing a processing on the image with the plurality of different values for the parameter in the presentation unit; and selecting an optimal one of the plurality of presented processing images in selection unit, in which a final value for the parameter is decided by repeatedly performing such a procedure that the generation unit further generates a plurality of different values for the parameter on the basis of a value for the parameter corresponding to the processing image selected by the selection unit, the presentation unit presents a plurality of processing images obtained by performing a processing on the image with the plurality of generated different values for the parameter, and the selection unit selects an optimal one of the plurality of presented processing images.

According to another embodiment of the present invention, there is provided a program for instructing a computer to function as: a generation unit configured to generate a plurality of different values for one parameter of a processing applied on an image; a presentation unit configured to present a plurality of processing images obtained by performing a processing on the image with the plurality of different values for the parameter; and a selection unit configured to select an optimal one of the plurality of presented processing images, in which a final value for the parameter is decided by repeatedly performing such a procedure that the generation unit further generates a plurality of different values for the parameter on the basis of a value for the parameter corresponding to the processing image selected by the selection unit, the presentation unit presents a plurality of processing images obtained by performing a processing on the image with the plurality of generated different values for the parameter, and the selection unit selects an optimal one of the plurality of presented processing images.

According to another embodiment of the present invention, a final value for a parameter is decided by repeatedly performing such a procedure that a plurality of different values for the parameter are generated on the basis of a value of a parameter corresponding to a selected processing image, a plurality of processing images obtained by performing a processing on an image with the plurality of generated different values for the parameter, and an optimal one of the plurality of presented processing images is selected.

The image processing apparatus may be an independent apparatus or a block configured to perform an image processing of the apparatus.

According to another embodiment of the present invention, it is possible to decide the optimal parameter used for applying the processing on the image.

In addition, according to another embodiment of the present invention, it is possible to decide the optimal parameter used for applying the processing on the image by way of the simple operation with the small storage amount.

BRIEF DESCRIPTION OF THE DRAWINGS

FIG. 23 is an explanatory diagram for describing an example in which parameters are decided through an axial conversion;

FIG. 30 is a block diagram of a configuration of a computer to which an embodiment of the present invention is applied.

DESCRIPTION OF THE PREFERRED EMBODIMENTS

First, with reference to FIG. 2, a description will be given of an outline of an image processing carried out by an image processing apparatus to which an embodiment of the present invention is applied.

An image processing apparatus 11 has two modes including a recording mode and a reproduction mode.

The recording mode is a mode in which respective moving images reproduced from a recording media are set as original images, a plurality of processing images obtained by setting mutually different values for a parameter of a processing are presented, and an optimal parameter for a user is decided among the plurality of presented processing images.

It should be noted that the recording mode has two types of presentation methods including a division screen display in which a plurality of processing images are displayed at the same time while being synthesized into one screen and a time division display in which a plurality of processing images are sequentially displayed in a time division manner. FIG. 2 illustrates an example of the division screen display, in which a plurality of processing images are displayed with different zoom factors used as the parameters of a processing.

On the other hand, the reproduction mode is a mode in which a processing is applied on an original image reproduced from a predetermined recording media by using the optimal parameter to the user decided in the recording mode, and the processing image obtained as the result is presented on the entire screen (one screen).

Figure 1:
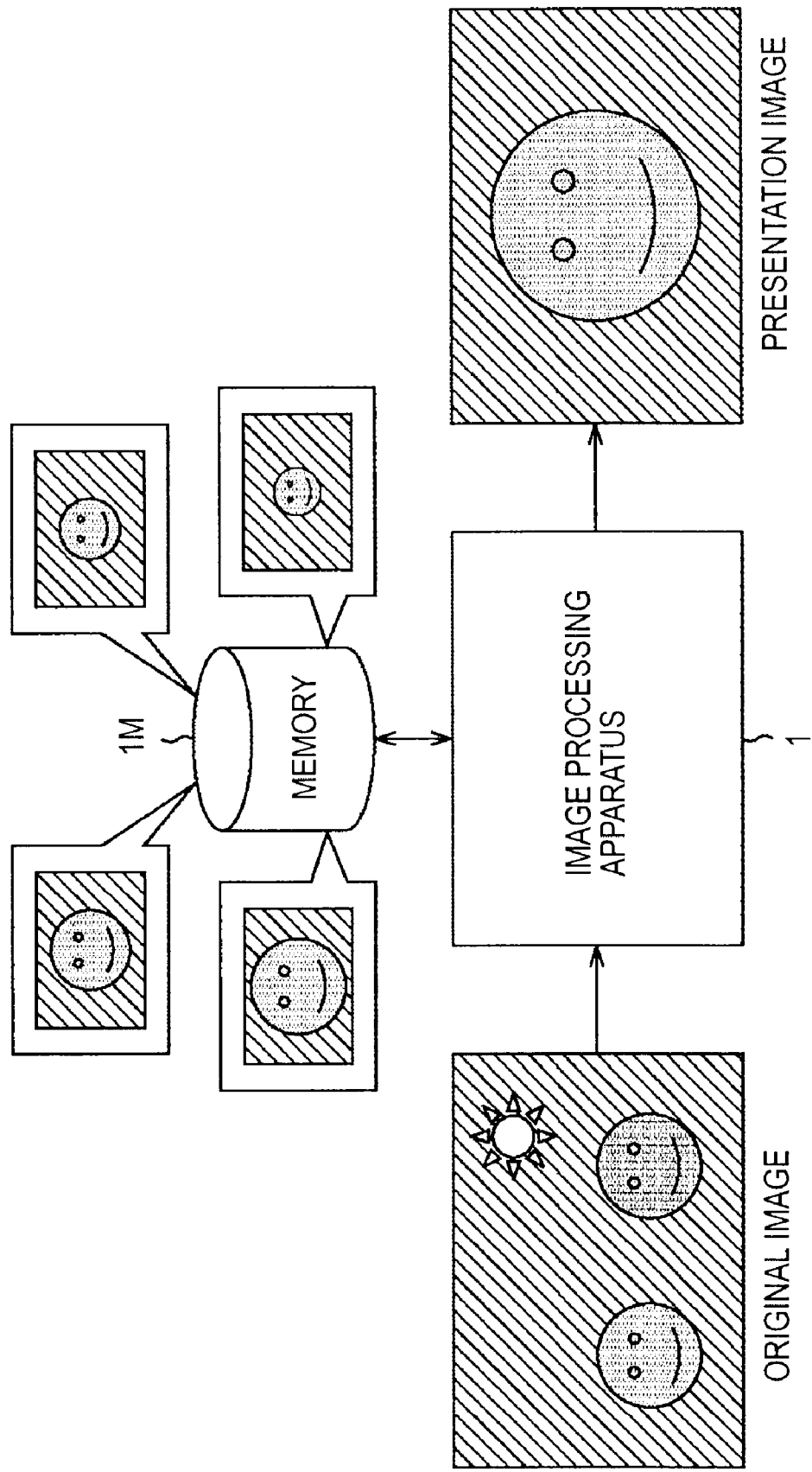
FIG. 1 is an explanatory diagram for describing an image processing apparatus in a related art.

In the recording mode, unlike the image processing apparatus 1 in the related art as described above with reference to FIG. 1, the image processing apparatus 11 does not store a plurality of processing images obtained with the different values for the parameter in a memory 11M but stores values for the parameter (zoom factors) as setting information. Therefore, as compared with the image processing apparatus 1, it is possible to reduce a memory volume.

Also, in the recording mode, the image processing apparatus 11 repeatedly further generates a plurality of parameter values on the basis of the value for the parameter selected by the user to narrow down the values for the parameter, and the optimal to the user is decided. Therefore, the common processing images using the plurality of parameter values presented in the recording mode are presented to all the users at the beginning. From the second time, different processing images are presented in accordance with the selection of the user. With this configuration, it is possible to decide the parameter further matching with a preference of the user.

Figure 3:
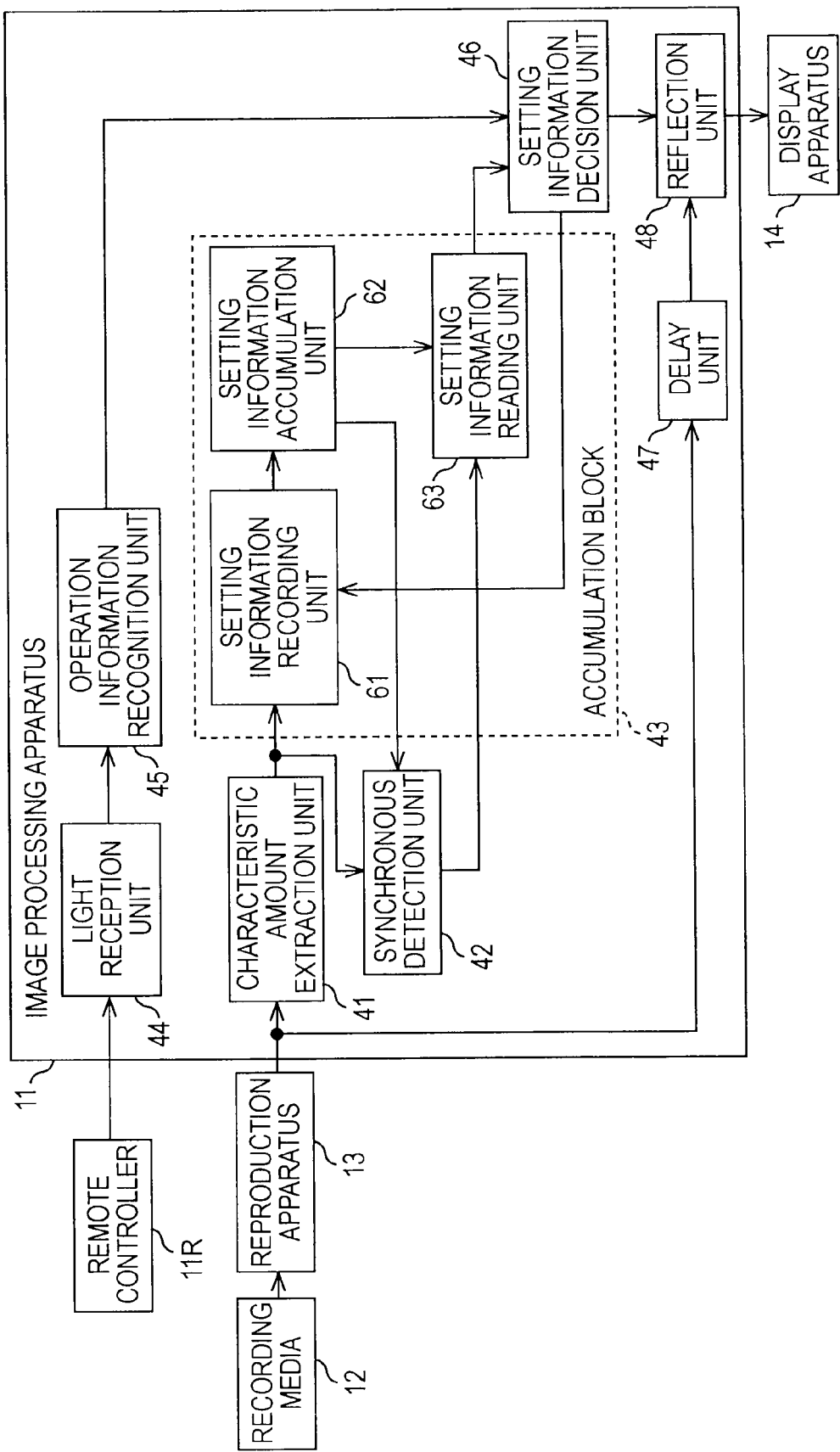
FIG. 3 is a block diagram of a configuration example of an image processing system to which an embodiment of the present invention is applied.

FIG. 3 illustrates a configuration example of an image processing system using the image processing apparatus 11 to which an embodiment of the present invention is applied.

It should be noted that according to the present embodiment, in the recording mode, the example will be described while the display is performed in the division screen display, and the time division display will be described below.

Figure 2:
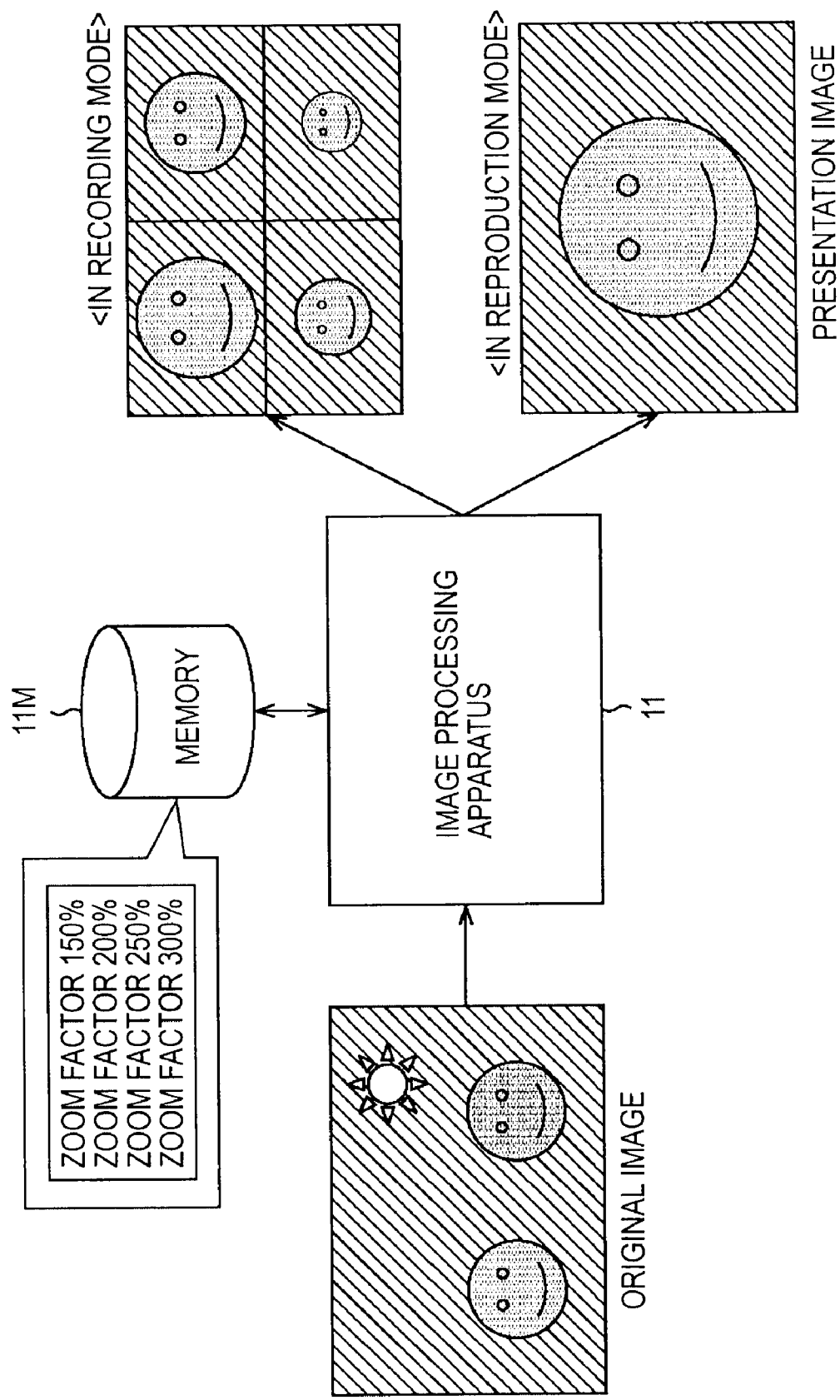
FIG. 2 is an explanatory diagram for describing an outline of an image processing performed by an image processing apparatus to which an embodiment of the present invention is applied.

The image processing system of FIG. 3 is composed of the image processing apparatus 11 shown in FIG. 2, a reproduction apparatus 13 configured to reproduce a recording media 12 to supply a moving image as an original image to the image processing apparatus 11, and a display apparatus 14 configured to display a processing image supplied from the image processing apparatus 11. It should be noted that the image processing apparatus 11 is provided with a remote controller 11R capable of instructing an operation from a remote place.

The image processing apparatus 11 is composed of a characteristic amount extraction unit 41, a synchronous detection unit 42, an accumulation block 43, a light reception unit 44, an operation information recognition unit 45, a setting information decision unit 46, a delay unit 47, and a reflection unit 48. As described above with reference to FIG. 2, in accordance with the respective modes including the recording mode and the reproduction mode, a predetermined processing is applied on an image supplied from the reproduction apparatus 13, and a processing image obtained as the result is displayed on the display apparatus 14.

It should be noted that the accumulation block 43 is composed of a setting information recording unit 61, a setting information accumulation unit 62, and a setting information reading unit 63.

The remote controller 11R is composed of a key and a button. The remote controller 11R generates an operation signal in accordance with an operation of the user and also generates a light emitting patter composed of infra-red ray or the like in accordance with the thus generated operation signal to be emitted to the image processing apparatus 11.

The reproduction apparatus 13 decodes image data previously recorded while being encoded in a predetermined format in the recording media 12 and sequentially supplies the images obtained as the result to the image processing apparatus 11. It should be noted that hereinafter, the image reproduced by the reproduction apparatus 13 and supplied is also referred to as reproduction image.

In both the recording mode and the reproduction mode, the characteristic amount extraction unit 41 extracts the characteristic amounts of the images sequentially supplied from the reproduction apparatus 13 and supplies characteristic amounts to the synchronous detection unit 42 and the setting information recording unit 61 of the accumulation block 43. It should be noted that a detailed configuration of the characteristic amount extraction unit 41 will be described below with reference to FIG. 4.

In the reproduction mode, the synchronous detection unit 42 searches the characteristic amounts accumulated in the setting information accumulation unit 62 (a search position characteristic amount which will be described below) for the characteristic amount matching with a characteristic amount of the reproduction image supplied from the characteristic amount extraction unit 41 (a reproduction position characteristic amount which will be described below)). In a case where the characteristic amount of the reproduction image is matched with the characteristic amounts accumulated in the setting information accumulation unit 62, the synchronous detection unit 42 supplies the matched characteristic amount as synchronous position information to the setting information reading unit 63. It should be noted that a detailed configuration of the synchronous detection unit 42 will be described below in detail with reference to FIGS. 5 and 6.

In the recording mode, the setting information recording unit 61 of the accumulation block 43 associates the setting information supplied from the setting information decision unit 46 with the characteristic amount of the reproduction image supplied from the characteristic amount extraction unit 41 to be accumulated (recorded) in the setting information accumulation unit 62. As described above, the setting information is the value for the parameter used for performing the processing on the reproduction image. The setting information accumulation unit 62 stores the characteristic amount and the setting information supplied from the setting information recording unit 61 and supplies the characteristic amount and the setting information in the setting information reading unit 63 as occasion demands.

In a case where the setting information reading unit 63 has the characteristic amount supplied from the synchronous detection unit 42 as the synchronous position information, the setting information reading unit 63 reads the setting information stored while being associated with the supplied characteristic amount from the setting information accumulation unit 62 to be supplied to the setting information decision unit 46.

The light reception unit 44 receives the light emitting pattern of the remote controller 11R to be converted into an operation signal and supplies the operation signal to the operation information recognition unit 45. The operation information recognition unit 45 recognizes operation information related to the processing on the image instructed by the user on the basis of the operation signal supplied from the light reception unit 44 and supplies the operation information to setting information decision unit 46.

In the recording mode, the setting information decision unit 46 supplies plural pieces of setting information for generating a plurality of processing images presented on a screen of the display apparatus 14 to the reflection unit 48. In addition, on the basis of the operation information supplied from the operation information recognition unit 45, the setting information decision unit 46 supplies the setting information selected by the user among the plural pieces of operation information supplied to the reflection unit 48 to the setting information recording unit 61 and also generates next plural pieces of operation setting information on the basis of the setting information selected by the user to be supplied to the reflection unit 48.

On the other hand, in the reproduction mode, the setting information decision unit 46 supplies the setting information which is supplied from the setting information reading unit 63, to the reflection unit 48.

The delay unit 47 delays the reproduction image supplied from the reproduction apparatus 13 by processing periods of time for the characteristic amount extraction unit 41, the synchronous detection unit 42, the accumulation block 43, and the setting information decision unit 46, and thereafter, the delay unit 47 supplies the reproduction image to the reflection unit 48. On the basis of the setting information supplied from the setting information decision unit 46, the reflection unit 48 applies a predetermined processing on the reproduction image and displays an image after the processing (processing image) on the display apparatus 14. It should be noted that the reflection unit 48 does not perform the processing on the reproduction image supplied from the delay unit 47 and can display the original image on the display apparatus 14 as it is.

Figure 4:
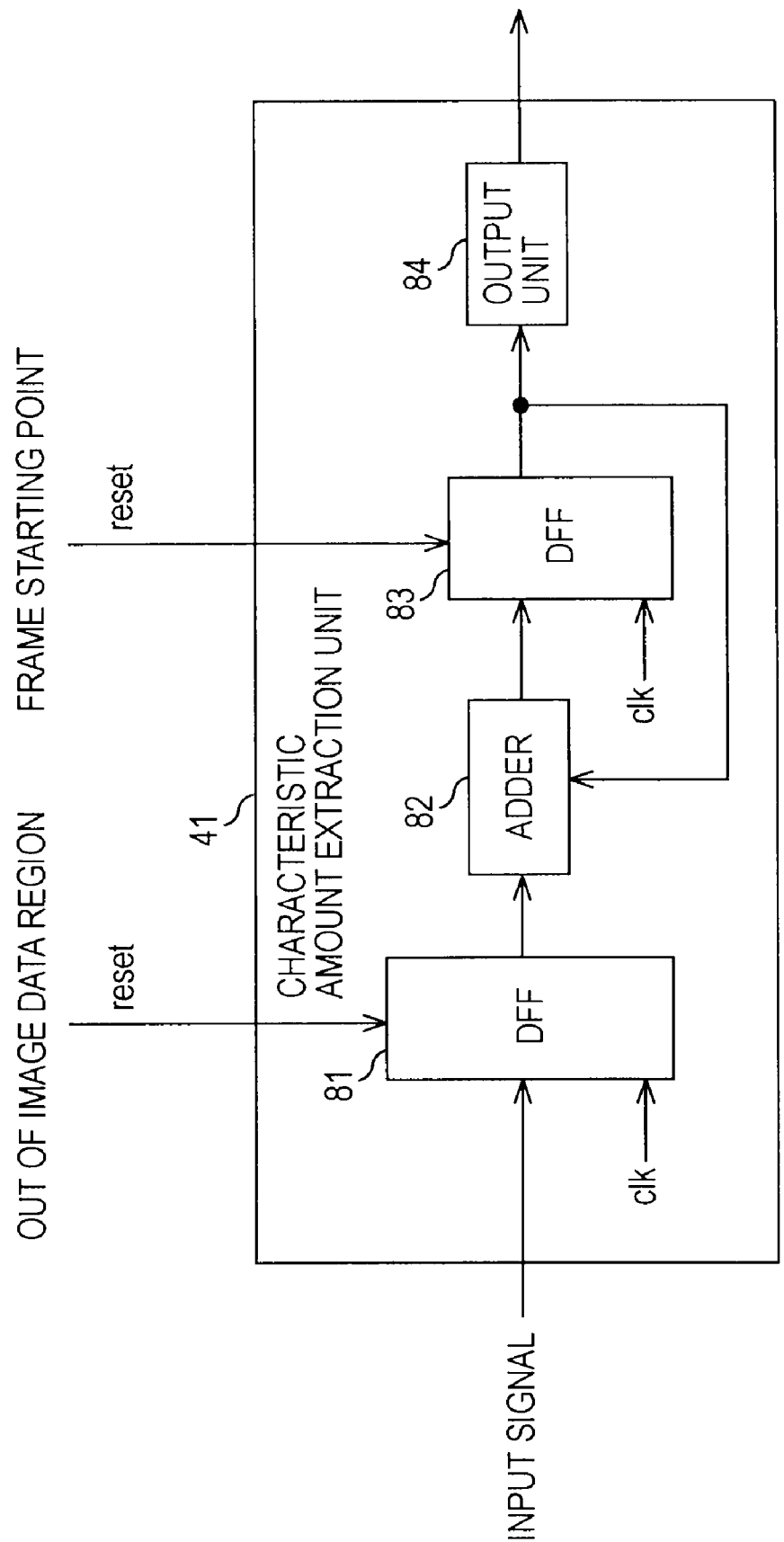
FIG. 4 is a block diagram of a detailed configuration of a characteristic extraction unit.

FIG. 4 is a block diagram of a detailed configuration of the characteristic amount extraction unit 41.

The characteristic amount extraction unit 41 at least includes a DFF (D-type flip flop) 81, an adder 82, a DFF (D-type flip flop) 83, and an output unit 84.

The DFF 81 stores an input signal immediately before and outputs the signal to the adder 82 at a timing when a clock signal (clk) is input from a clock signal generator which is not shown. In addition, in the DFF 81, when the input signal is a signal out of the image data region, a reset signal (reset) is input, and the input signal is deleted and output. In other words, the DFF 81 supplies only the data in the image data region among the input signals (the signals of the reproduction image) in synchronism with the clock signal to the adder 82.

The adder 82 adds the signal supplied from the DFF 81 and the signal supplied from the DFF 83 to be output to the DFF 83. To be more specific, the adder 82 extracts low-order 8 bits among the addition result of the signal supplied from the DFF 81 and the signal supplied from the DFF 83 to be supplied to the DFF 83.

The DFF 83 supplies the signal supplied from the adder 82 to the adder 82 and the output unit 84 at a timing when a clock signal (clk) is input from the clock signal generator which is not shown. With this configuration, the DFF 83 supplies the value to which only the data in the image data region is added accumulatively by the adder 82, to the output unit 84.

When a value in one frame is supplied from the DFF 83, the output unit 84 outputs the value as the characteristic amount of the image in the frame. In other words, the output unit 84 outputs the low-order 8 bits of the value to which only the data in the image data region is added accumulatively by the adder 82 as the characteristic amount in the frame. It should be noted that the characteristic amount may be information in which the image can be identified in units of one frame. Thus, not only the low-order 8 bits of the value to which only the data in the image data region (only the pixel value) is added accumulatively, but also, for example, the addition result of only the pixel value in a predetermined region in the vicinity of the center of the image data region may be used as it is. It should be noted that according to the present embodiment, as described above, the characteristic amount of the image is calculated in units of frame, but the characteristic amount of the image may also be calculated in units of field.

Figure 5:
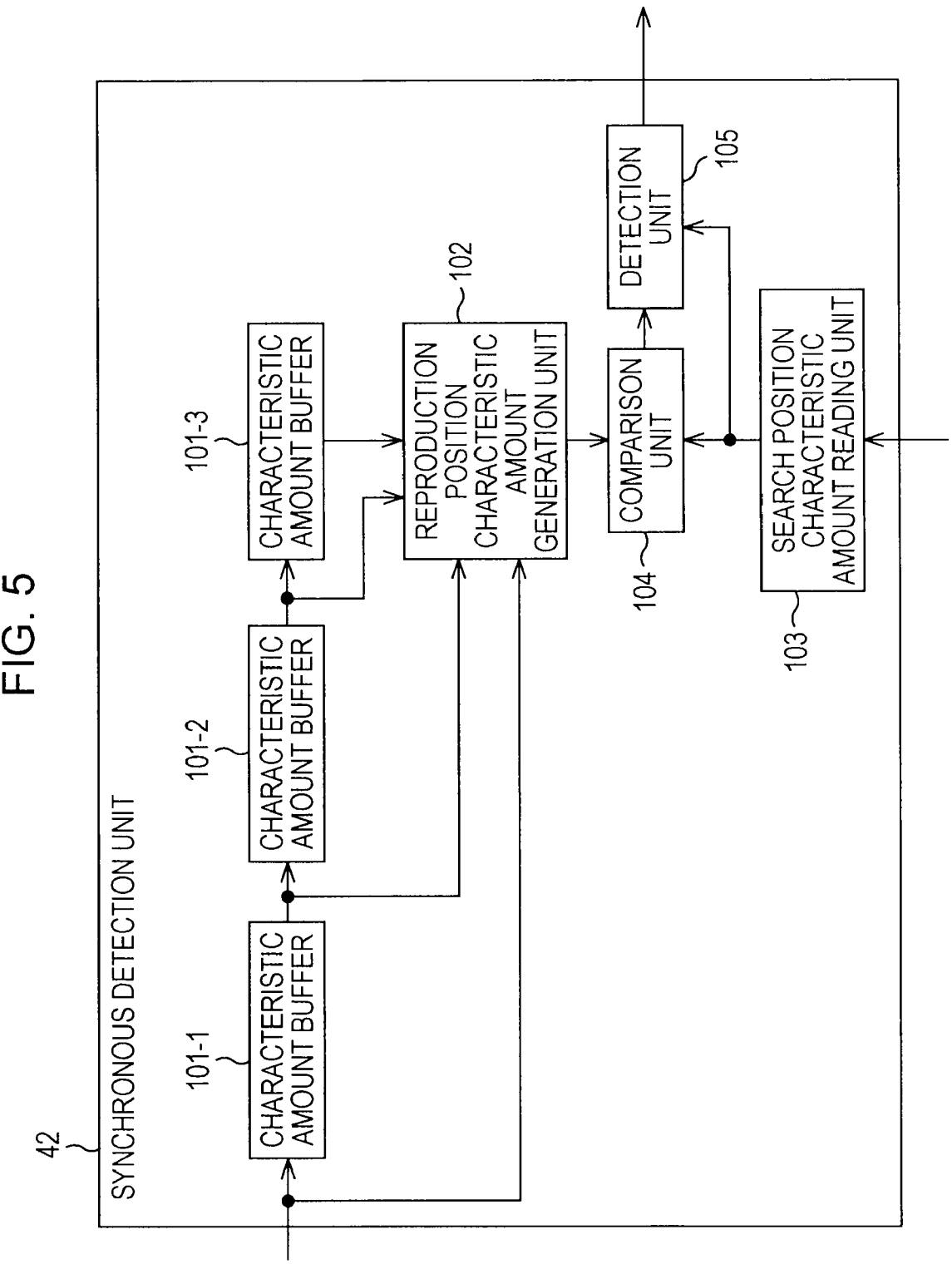
FIG. 5 is a block diagram of a detailed configuration of a synchronous detection unit.

Next, with reference to FIG. 5, a detailed configuration of the synchronous detection unit 42 will be described.

The synchronous detection unit 42 is composed of characteristic amount buffers 101-1 to 101-3, a reproduction position characteristic amount generation unit 102, a search position characteristic amount reading unit 103, a comparison unit 104, and a detection unit 105.

The characteristic amount buffers 101-1 to 101-3 are configured to temporarily store the supplied characteristic amounts and also sequentially output the characteristic amounts stored so far to the reproduction position characteristic amount generation unit 102 and the characteristic amount buffers 101-2 and 101-3 in a later stage. It should be noted that the characteristic amount buffer 101-3 does not have the characteristic amount buffer 101 in a later stage, and therefore outputs the characteristic amount only to the reproduction position characteristic amount generation unit 102.

The reproduction position characteristic amount generation unit 102 supplies the characteristic amount of the most recent four frames in which the newest frame supplied to the synchronous detection unit 42 and the characteristic amounts of the past three frames supplied from the characteristic amount buffers 101-1 to 101-3 are added, as the reproduction position characteristic amount to the comparison unit 104.

The search position characteristic amount reading unit 103 sequentially reads the characteristic amounts accumulated in the setting information accumulation unit 62 in units of continuous four pieces to be supplied as the search position characteristic amount to the comparison unit 104 and the detection unit 105. The comparison unit 104 compares the reproduction position characteristic amount supplied from the reproduction position characteristic amount generation unit 102 with the search position characteristic amounts sequentially supplied from the search position characteristic amount reading unit 103. In a case where, the search position characteristic amount is searched which matches with the reproduction position characteristic amount, the comparison unit 104 regards that the synchronous is detected and notifies the detection unit 105 of that effect. In accordance with the timing when the comparison unit 104 notifies that the synchronous is detected, the detection unit 105 supplies the synchronous position information.

Figure 6:
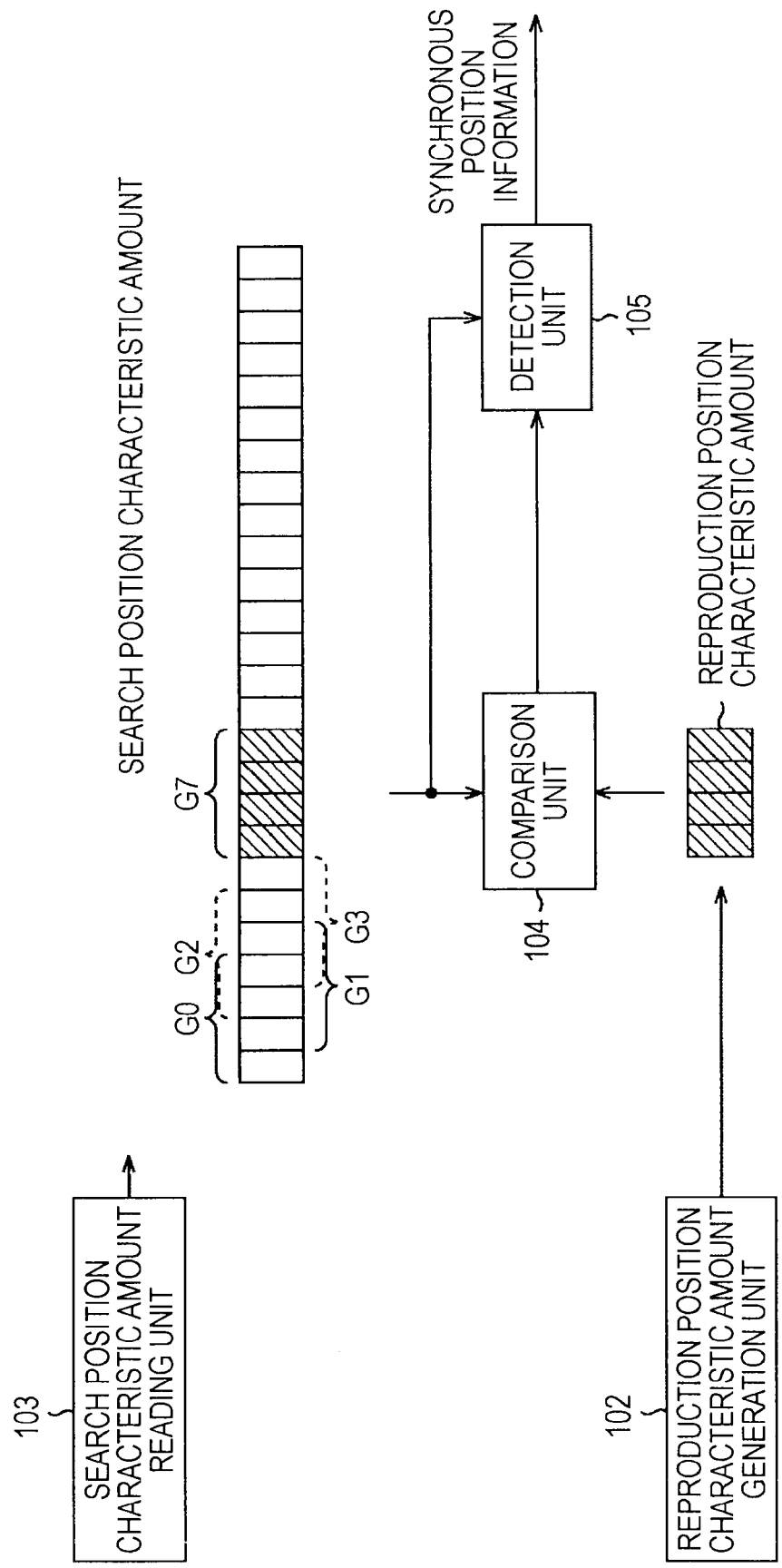
FIG. 6 is an explanatory diagram for describing a synchronous detection processing.

With reference to FIG. 6, the synchronous detection processing performed by the synchronous detection unit 42 will be further described.

In FIG. 6, a vertically-long rectangular box in the drawing represents a characteristic amount of one frame, and the lower side of FIG. 6 represents that the reproduction position characteristic amount generation unit 102 supplies the characteristic amount of the most recent four frames as the reproduction position characteristic amount to the comparison unit 104.

Also, a large number of rectangular boxes arranged in a lateral direction on the upper side of FIG. 6 represent characteristic amounts of a large number of frames stored in the setting information accumulation unit 62. Then, the characteristic amounts of the large number of frames are read while shifting one frame by one frame like the search position characteristic amounts G0, G1, G2, G3, . . . , four frames each from the forefront by the search position characteristic amount reading unit 103.

For example, in a case where the search position characteristic amount G7 which is the characteristic amount from the eighth frame to the eleventh frame from the forefront indicated by diagonal lines in FIG. 6 is matched with the reproduction position characteristic amount, the comparison unit 104 notifies the detection unit 105 that the synchronous is detected, and at that timing, the detection unit 105 supplies the characteristic amount at the forefront position of the search position characteristic amount supplied from the search position characteristic amount reading unit 103, that is, the eighth characteristic amount from the forefront position as the synchronous position information to the setting information reading unit 63.

Figure 7:
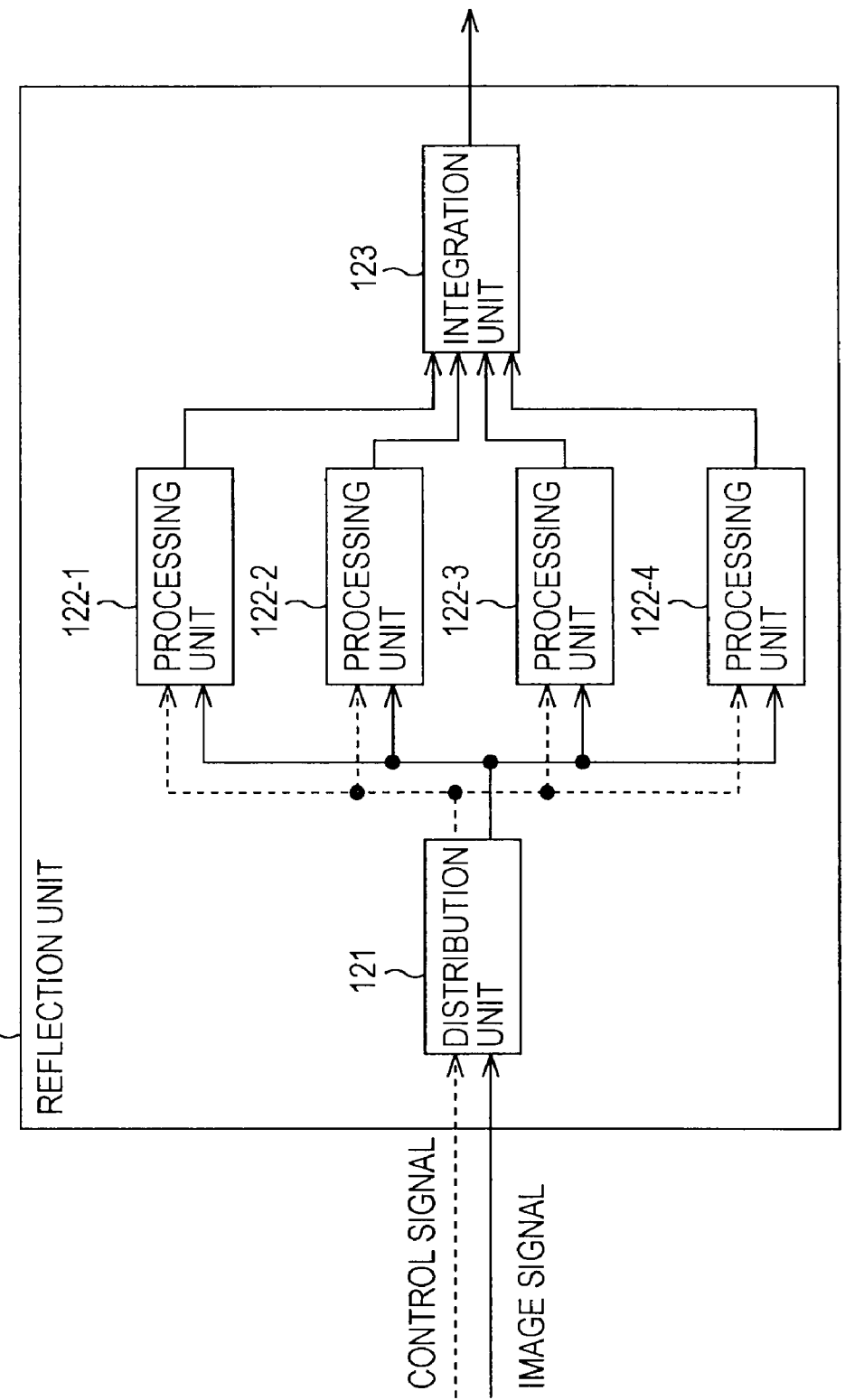
FIG. 7 is a block diagram of a detailed configuration of a reflection unit.

Next, with reference to FIG. 7, a detailed configuration example of the reflection unit 48 will be described.

The reflection unit 48 is composed of a distribution unit 121, processing units 122-1 to 122-4, and an integration unit 123.

The image signal of the reproduction image supplied from the reproduction apparatus 13 is supplied to the distribution unit 121 from the delay unit 47, and also the setting information of the processing applied on the reproduction image is supplied as the control signal to the distribution unit 121 from the setting information decision unit 46.

The distribution unit 121 supplies the reproduction image and the setting information supplied as the image signal and the control signal to the respective processing units 122-1 to 122-4. The setting information is, for example, the values of four different zoom factors in the example as described above with reference to FIG. 2 in the recording mode. In the reproduction mode, the setting information is the value of one optimal zoom factor decided by the user in the recording mode.

In the recording mode, the four parameter values corresponding to the respective processing units 122-1 to 122-4 are collectively supplied to the respective processing units 122-1 to 122-4 as the setting information. Thus, the respective processing units 122-1 to 122-4 identify the parameter for itself among the supplied parameters and perform the processing based on the identified parameter on the reproduction image. Then, the processing images after the processing are supplied from the respective processing units 122-1 to 122-4 to the integration unit 123.

On the other hand, in the reproduction mode, the same (the single) parameter value is supplied to the respective processing units 122-1 to 122-4. Thus, the respective processing units 122-1 to 122-4 perform the same processing on the reproduction image and supply the processing images after the processing to the integration unit 123.

The integration unit 123 supplies to the display apparatus 14, a synthesis image obtained by displaying the processing images processed with the different parameters by the respective processing units 122-1 to 122-4 in the recording mode on respective small screens obtained by dividing the screen into four equal parts.

On the other hand, in the reproduction mode, the integration unit 123 is supplied with the same processing images from the respective processing units 122-1 to 122-4. Thus, the integration unit 123 supplies one of the processing images supplied from the processing units 122-1 to 122-4 to the display apparatus 14 as it is.

Therefore, in the reproduction mode, the respective processing units 122-1 to 122-4 performs the same processing, and only one of the processing images processed by the respective processing units 122-1 to 122-4 is utilized. Thus, only one of the processing units 122-1 to 122-4 may be operated.

Next, a processing in the image processing apparatus 11 will be described for the respective modes including the recording mode and the reproduction mode.

First, a processing in the image processing apparatus 11 in the recording mode will be described.

It should be noted that in the recording mode, from the reproduction apparatus 13, all the moving images recorded in the recording media 12 or a part of the moving images specified by the user is repeatedly reproduced (repeat reproduction), and the reproduction image is supplied the image processing apparatus 11.

In the recording mode, the image processing apparatus 11 regularly detects (extracts) the characteristic amount of the reproduction image supplied from the reproduction apparatus 13. Also, when any one of four processing images obtained by processing the reproduction image displayed on the display apparatus 14 with different four parameter values is selected by the user, a processing is performed for storing the value for the parameter corresponding to the selected processing image while being associated with the detected characteristic amount in the setting information accumulation unit 62 of the accumulation block 43 as setting information.

To be more specific, in the image processing apparatus 11, while the characteristic amount of the reproduction image supplied from the reproduction apparatus 13 is regularly detected (extracted), in a case where the user selects a predetermined parameter value is selected, the following two processings are executed at the same time including the characteristic amount accumulation processing for storing the selected setting information while being associated with the characteristic amount and the setting information decision processing for displaying the four processing images which are obtained by processing the reproduction image with the four different parameter values and notifying the characteristic amount accumulation processing of the selected parameter value when any one of the four processing images is selected by the user.

In view of the above, first, with reference to a flow chart of FIG. 8, the characteristic amount accumulation processing will be described.

When the mode of the image processing apparatus 11 is set as the recording mode, first, in step S1, the image processing apparatus 11 determines whether or not the next reproduction image (the new reproduction image) is input. In step S1, the processing is repeatedly performed until it is determined that the next reproduction image is input, and in a case where it is determined that the next reproduction image is input, the processing advances to step S2.

In step S2, the image processing apparatus 11 supplies the input reproduction image to the characteristic amount extraction unit 41 and the delay unit 47. The delay unit 47 delays the supplied reproduction image for a predetermined period of time and then supplies the reproduction image to the reflection unit 48.

In step S3, the characteristic amount extraction unit 41 performs the characteristic amount extraction processing for extracting (detecting) the characteristic amount of the supplied reproduction image. A detail of the characteristic amount extraction processing will be described with reference to a flow chart of FIG. 9. With this configuration, the characteristic amount of the reproduction image (the frame image) is supplied to the synchronous detection unit 42 and the setting information recording unit 61.

In step S4, the setting information recording unit 61 determines whether or not the setting information is supplied from the setting information decision unit 46.

In step S4, in a case where it is determined that the setting information is supplied from the setting information decision unit 46, that is, in a case where one processing image is selected by the user among the four processing images obtained by processing the reproduction image with different four parameter values, and the value for the parameter corresponding to the selected processing image is supplied as the setting information to the setting information recording unit 61, the processing advances to step S5. The setting information recording unit 61 stores the setting information supplied from the setting information decision unit in the setting information accumulation unit 62 while being associated with the characteristic amount supplied from the characteristic amount extraction unit 41.

Figure 9:
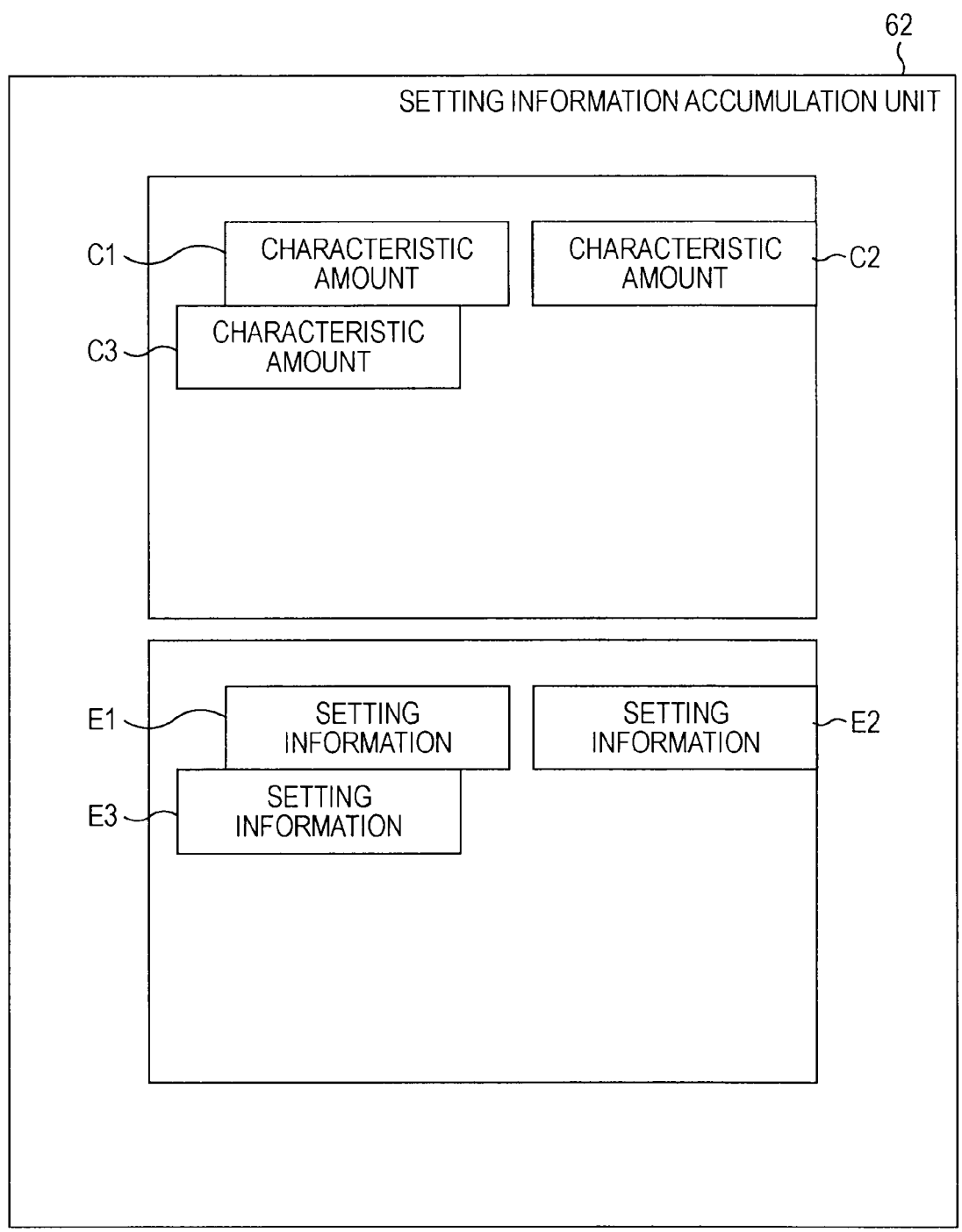
FIG. 9 is an explanatory diagram for describing a storage of setting information and characteristic amount into a setting information recording unit.

For example, as shown in FIG. 9, in a case where a characteristic amount C1 is stored at a predetermined address, the setting information recording unit 61 stores the setting information E1 associated with the characteristic amount C1 at an address multiplied by m, that is, an address m×A.

In a similar manner, when a characteristic amount C2 is stored at an address B, the setting information recording unit 61 stores the corresponding setting information at an address m×B. Furthermore, when a characteristic amount C3 is stored at an address C, the setting information recording unit 61 stores the corresponding setting information E3 at an address m×C. As the setting information is stored while being associated with the characteristic amount in this way, if the characteristic amount is decided, it is possible to identify the address of the setting information from the address of the characteristic amount. Thus, it is possible to smoothly search for the setting information for each of the characteristic amounts in the setting information accumulation unit 62.

While returning back to FIG. 8, in step S4, in a case where it is determined that the setting information is not supplied from the setting information decision unit 46, the processing in step S5 will be skipped.

Then, in step S6, the image processing apparatus 11 determines whether or not ending of the operation is instructed. Herein, the instruction for ending the operation represents, for example, ending of the recording mode, an operation for turning OFF of a power source of the image processing apparatus 11, and the like.

In step S6, in a case where it is determined that the ending of the operation is not instructed, the processing is returned to step S1, and the above-mentioned processing in steps S1 to S6 is repeatedly performed. On the other hand, in step S6, in a case where it is determined that the ending of the operation is instructed, the processing is ended.

Figure 10:
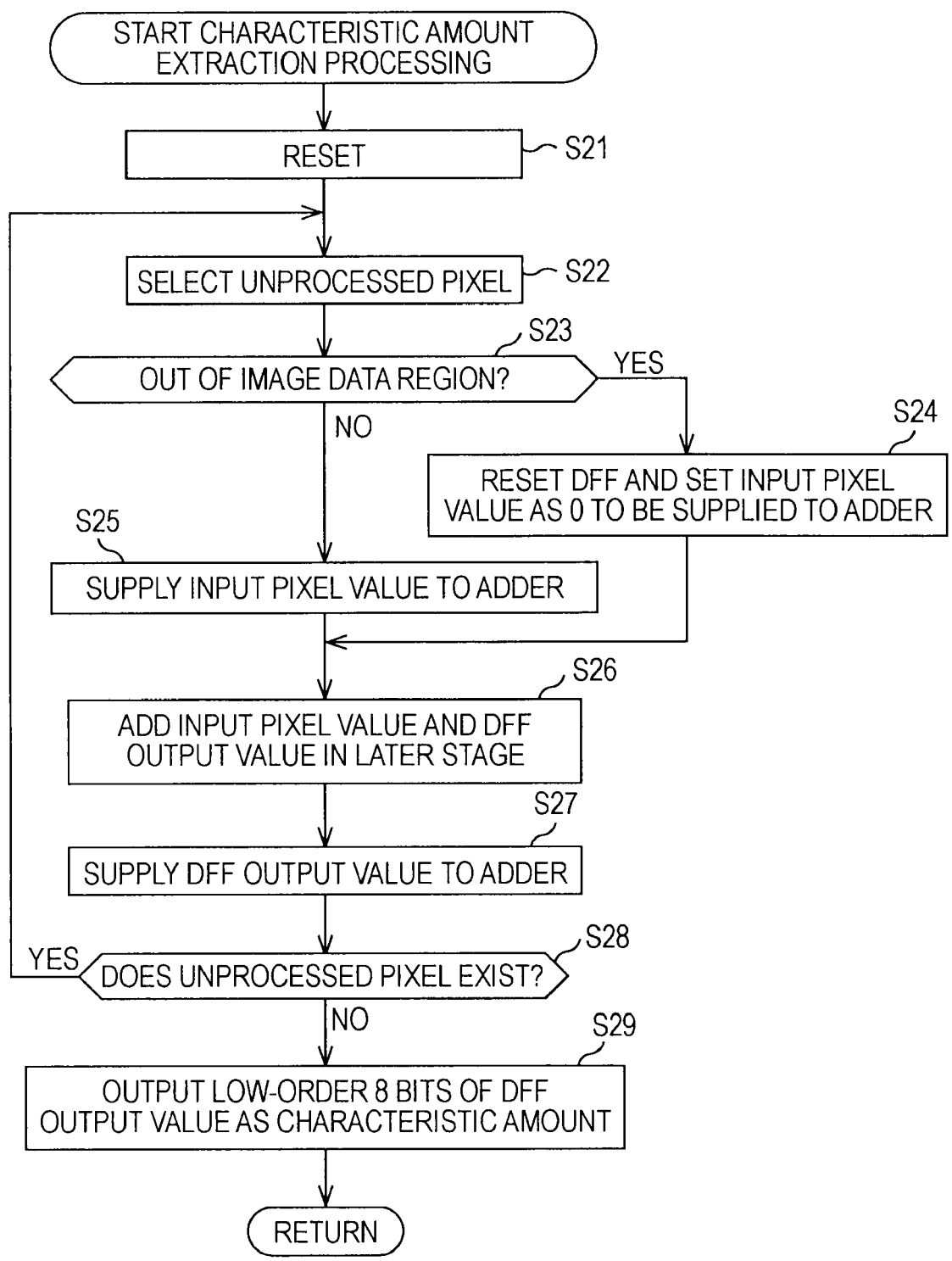
FIG. 10 is a flow chart for describing a characteristic amount extraction processing.

Next, with reference to a flow chart of FIG. 10, a detail of the characteristic amount extraction processing in step S3 in the characteristic amount accumulation processing will be described.

In step S21, the characteristic amount extraction unit 41 reset the data (bits) held in the DFF 83.

In step S22, the characteristic amount extraction unit 41 selects an unprocessed pixel among the pixels of the reproduction image. In step S23, it is determined whether or not the selected pixel is out of the region of the image data. That is, the characteristic amount extraction unit 41 sequentially reads the unprocessed pixels of the reproduction image for one frame in the raster scan order to determine whether or not the pixel is out of the region of the image data.

In step S23, in a case where it is determined that the selected pixel is out of the region of the image data, the processing advances to step S24, where the DFF 81 is reset, and 0 is output to the adder 82 as the pixel value. On the other hand, in step S23, in a case where it is determined that the selected pixel is within the region of the image data, the processing advances to step S25, where the DFF 81 supplies the pixel value to the adder 82 at the timing of the clock signal generation.

In step S26, the adder 82 adds the input pixel value and the signal with each other supplied from the DFF 83 to be supplied to the DFF 83.

In step S27, the DFF 83 returns the low-order 8 bits of the addition result supplied at the timing of the clock signal generation from the adder 82 to the adder 82. At this time, the DFF 83 supplies the addition result also to the output unit 84, but the output unit 84 does not output the addition result.

In step S28, the characteristic amount extraction unit 41 determines whether or not an unprocessed pixel exists. In a case where it is determined that an unprocessed pixel still exists, the processing is returned to step S22. With this configuration, until all the pixels for one frame are processed, the processing in steps S22 to S28 is repeatedly performed. Then, in step S28, in a case where it is determined that an unprocessed pixel does not exists, that is, in a case where all the pixels for one frame are processed, the processing advances to step S29, where the output unit 84 outputs the addition result supplied from the DFF 83, that is, the low-order 8 bits of the accumulated addition results of the pixel values belonging to the image data region as the characteristic amount of the image in one frame.

With the above-mentioned processing, the low-order 8 bits of the accumulated addition results of all the pixel values in the image data region of the reproduction image for one frame are extracted as the characteristic amount of the reproduction image.

Next, the setting information decision processing which is the other processing in the recording mode will be described.

Figure 11:
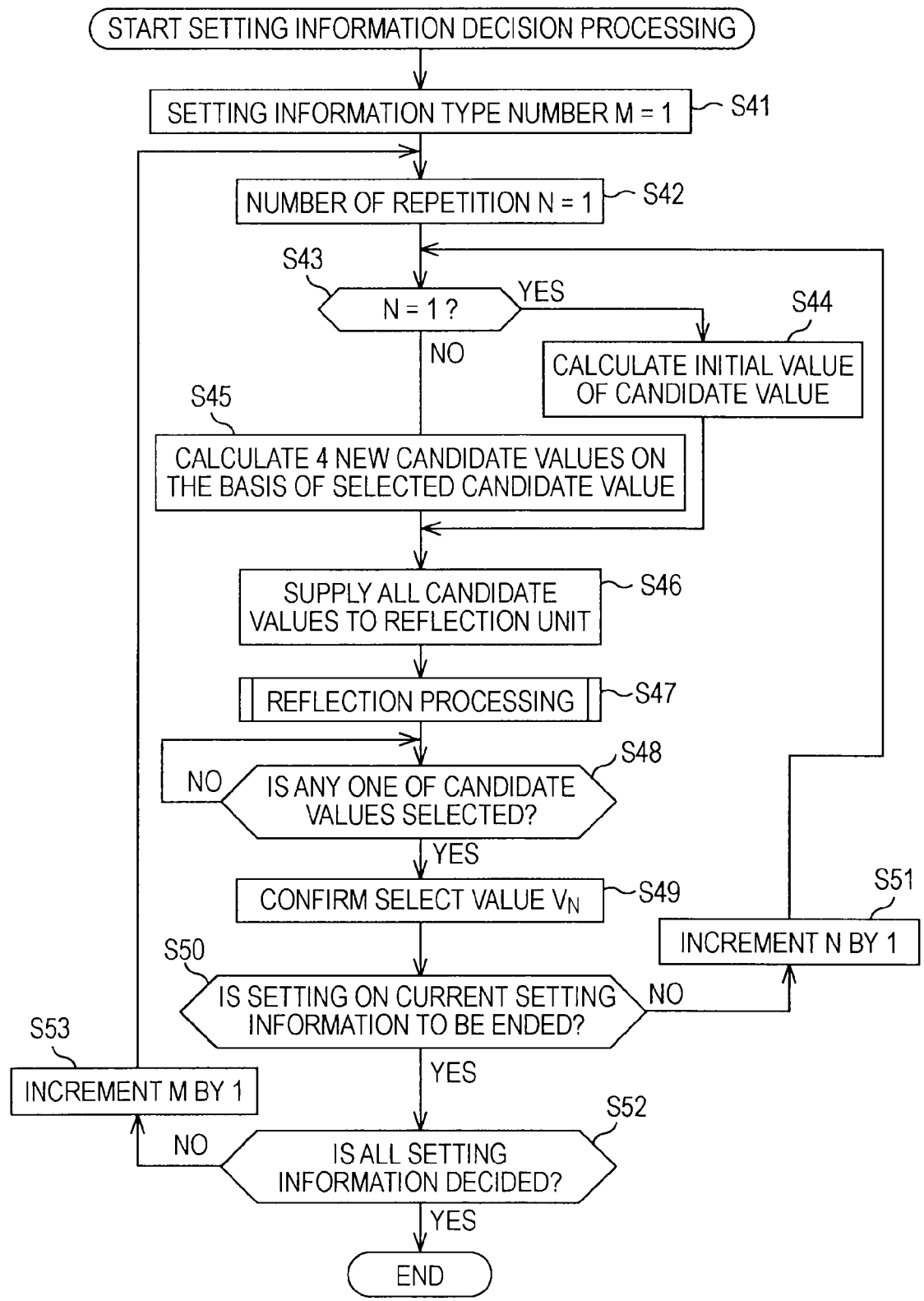
FIG. 11 is a flow chart for describing a setting information decision processing.

FIG. 11 is a flow chart of the setting information decision processing.

First, in step S41, the setting information decision unit 46 sets the setting information type number M for identifying a type of the setting information as 1.

Figures 12, 13:
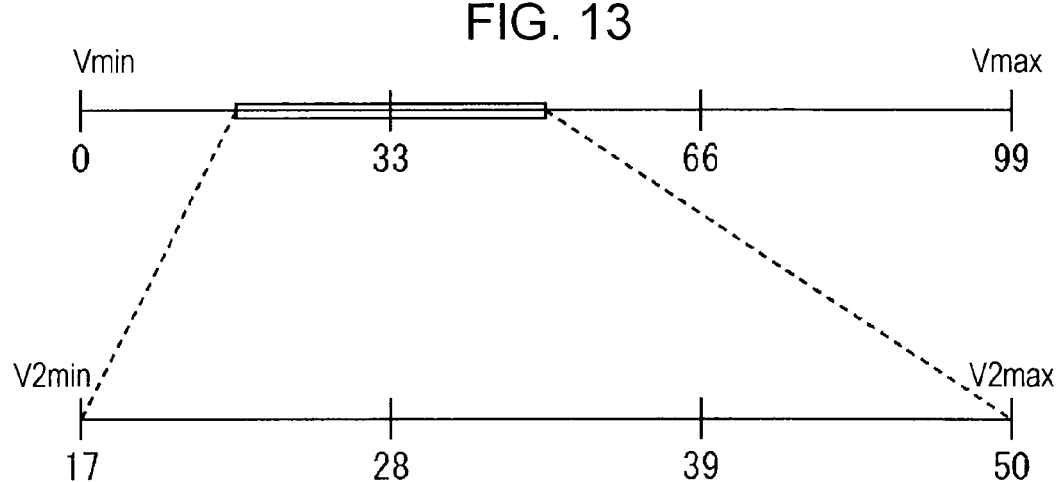
FIG. 12 illustrates a setting information table example.
FIG. 13 is an explanatory diagram for describing new generation of candidate numbers.

As shown in FIG. 12, the setting information decision unit 46 stores various pieces of setting information such as ones related to adjustment values of the image quality including luminance of the image, color depth, resolution, and noise elimination, ones related to the image frame including a video format and a zoom image frame, and ones related to adjustment values of the audio volume including volume and noise elimination as a table which is associated with the setting information type number M (hereinafter, also referred to as setting information table). In the example of FIG. 12, by using the setting information type number 1 (M=1), the zoom image frame decided by the zoom center coordinate and the zoom factor is stored, and the luminance of the image is stored as the setting information type number 2 (M=2). Similarly, as setting information identification numbers 3, 4, 5, 6, and 7, the color depth of the image, the color shade of the image, the noise reduction, the resolution, and the audio filter are stored, respectively. The setting information decision unit 46 sequentially changes the setting information type numbers M and repeatedly performs a processing in steps S42 to S51 which will be described below. In this manner, the setting information optimal to the user is decided for all the setting information.

In step S42, the setting information decision unit 46 sets the number of repetitions N which is the number of narrowing down of the parameter value for the current setting information identified by the setting information type number M as 1.

In step S43, the setting information decision unit 46 determines whether or not the number of repetitions N is 1.

In step S43, in a case where it is determined that the number of repetitions N is 1, that is, in a case where the selection of the current setting information identified by the setting information type number M is for the first time, in step S44, the setting information decision unit 46 calculates initial values of four candidate value for the current setting information identified by the setting information type number M. A method of calculating the initial values will be described below together with a description on the processing in step S45.

On the other hand, in step S43, in a case where it is determined that the number of repetitions N is not 1, as the candidate value selected by the user exists, in step S49 which will be described below, the setting information decision unit 46 calculates four new candidate values on the basis of the candidate value selected by the user in step S45.

For example, in a case where the value range for the setting information of a certain setting information type number M is Vmim≦V≦Vmax, it is possible for the setting information decision unit 46 to calculate four candidate values for the N-th time $V_N(x)$ (x=0 to 3) through the following Expression (1).

Expression (1)

$$\begin{cases} V_N(x) = \dfrac{x \cdot V_{Nmax} + (X - x) \cdot V_{Nmin}}{X} \\ V_{Nmax} = V_{N-1} + \dfrac{V_{max} - V_{min}}{2X^{N-1}} \\ V_{Nmin} = V_{N-1} - \dfrac{V_{max} - V_{min}}{2X^{N-1}} \end{cases} \quad (1)$$

In Expression (1), X denotes a value obtained by subtracting 1 from the number of candidate values (4) (X=the number of candidate number−1), and $V_{Nmax}$ and $V_{Nmin}$ denote the maximum value and the minimum value for the N-th time, respectively.

Expression (1) can be expressed by a recurring formula like Expression (2).

Expression (2)

$$\begin{cases} V_1(x) = \dfrac{x \cdot V_{Nmax} + (X - x) \cdot V_{Nmin}}{X} \\ V_N(x) = V_{N-1} + \dfrac{V_{max} - V_{min}}{2X^N}(2x - X) \\ V_{min} \le V_n \le V_{max} (n = 1, 2, \ldots, N) \end{cases} \quad (2)$$

According to Expression (2), it is understood that by repeatedly selecting one among the four candidate values presented by the user, the parameter values are narrowed down.

A specific numeric value example will be described. For example, in a case where Vmim≦V≦Vmax is 0≦V≦99, the four candidate values $V_1(0)$ to $V_1(3)$ for the first time can be obtained as follows.

Expression (3)

$$V_1(0) = \frac{0 \cdot 99 + (3 - 0) \cdot 0}{3} = 0$$

$$V_1(1) = \frac{1 \cdot 99 + (3 - 1) \cdot 0}{3} = 33$$

$$V_1(2) = \frac{2 \cdot 99 + (3 - 2) \cdot 0}{3} = 66$$

$$V_1(3) = \frac{3 \cdot 99 + (3 - 3) \cdot 0}{3} = 99$$

Therefore, the four processing images having the values for the parameter 0, 33, 66, and 99 are presented to the display apparatus 14. Next, if the user selects the processing image corresponding to the value for the parameter 33 among the four processing images having the values for the parameter 0, 33, 66, and 99, the four candidate values $V_2(0)$ to $V_2(3)$ for the second time can be obtained as follows.

Expression (4)

$$V_2(0) = 33 + \frac{99 - 0}{2 \cdot 3^2} \cdot (2 \cdot 0 - 3) = 33 - \frac{99 \cdot 3}{2 \cdot 3^2} = 16.5 \approx 17$$

$$V_2(1) = 33 + \frac{99 - 0}{2 \cdot 3^2} \cdot (2 \cdot 1 - 3) = 33 - \frac{99}{2 \cdot 3^2} = 27.5 \approx 28$$

$$V_2(2) = 33 + \frac{99 - 0}{2 \cdot 3^2} \cdot (2 \cdot 2 - 3) = 33 + \frac{99}{2 \cdot 3^2} = 38.5 \approx 39$$

$$V_2(3) = 33 + \frac{99 - 0}{2 \cdot 3^2} \cdot (2 \cdot 3 - 3) = 33 + \frac{99 \cdot 3}{2 \cdot 3^2} = 49.5 \approx 50$$

The four candidate values for the first time $V_1(0)$ to $V_1(3)$ and the four candidate values $V_2(0)$ to $V_2(3)$ for the second time become as shown in FIG. 13. As will be understood with reference to FIG. 13, the setting information decision unit 46 decides values at the border when a predetermined range (a range between 17 and 50) while the candidate value 33 selected for the first time is used as the center value is divided into three equal parts ("the number of candidates−1" equal parts) as new parameter values. Therefore, as the number of repetitions is increased, the range of the candidate values is narrowed down, and it is possible to perform the fine adjustment.

In step S46, the setting information decision unit 46 supplies all the candidate values calculated in step S44 or step S45 to the reflection unit 48.

In step S47, the reflection unit 48 performs a reflection processing for reflecting the four candidate values supplied from the setting information decision unit 46 with the reproduction image displayed on the display apparatus 14. The detail of this processing will be described below with reference to FIG. 14.

In step S48, on the basis of the operation information supplied from the operation information recognition unit 45, the setting information decision unit 46 determines whether or not any one of the candidate values is selected by the user among the four presented candidate values, and the flow stands by until it is determined that any one of the candidate values is selected.

In step S48, in a case where it is determined that any one of the candidate values is selected by the user, the setting information decision unit 46 confirms the selected candidate value as the selected value $V_N$ for the N-th time in step S49.

In step S50, the setting information decision unit 46 determines whether or not the setting (narrow down) related to the current setting information identified by the setting information type number M is to be ended. In step S50, in a case where the user performs the ending operation, where it is difficult to generate a new candidate value, or where the number of repetitions N reaches a predetermined number which is previously set, for example, it is determined that the setting related to the current setting information is to be ended.

In step S50, in a case where it is determined that the setting related to the current setting information is not to be ended, the setting information decision unit 46 increments the number of repetitions N by 1 in step S51, and thereafter the processing is returned to step S43. With this configuration, the processing in steps S43 to S50 is repeatedly performed again.

On the other hand, in step S50, in a case where it is determined that the setting related to the current setting information is to be ended, the processing advances to step S52, where the setting information decision unit 46 determines whether or not the optimal parameter values are decided for all the setting information.

In step S52, in a case where it is determined that the optimal parameter values are not decided yet for all the setting information, the setting information decision unit 46 increments the setting information type number M by 1 in step S53, and the processing is returned to step S42. With this configuration, with regard to the next setting information, the processing in the above-mentioned steps S42 to S52 is repeatedly performed.

On the other hand, in step S52, in a case where it is determined that the optimal parameter values are decided all the setting information, the processing is ended.

Figures 14, 15:
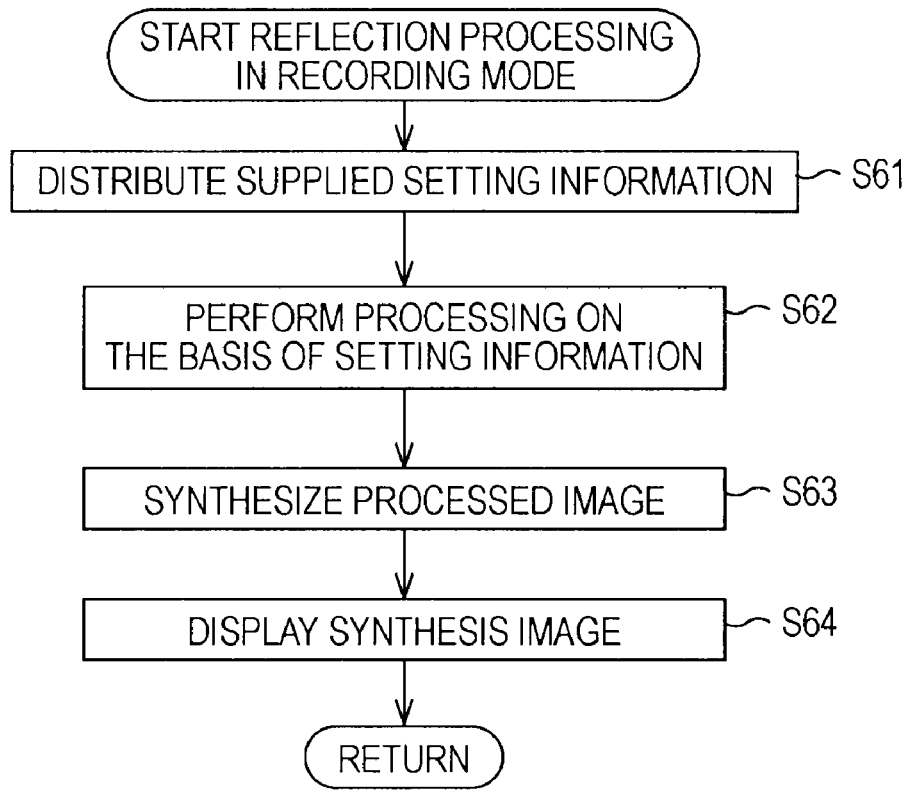
FIG. 14 is a flow chart for describing a reflection processing.
FIG. 15 illustrates an example of setting information.

FIG. 14 is a flow chart for describing a detailed processing of the reflection processing in the above-mentioned step S47.

In step S61, the distribution unit 121 of the reflection unit 48 distributes the supplied setting information from the setting information decision unit 46. To be more specific, the distribution unit 121 supplies the four candidate values supplied from the setting information decision unit 46 to the respective processing units 122-1 to 122-4. In addition, the distribution unit 121 also supplies the reproduction image supplied from the delay unit 47, to the respective processing units 122-1 to 122-4.

In step S62, the respective processing units 122-1 to 122-4 perform a processing on the basis of the setting information. For example, in a case where a parameter in the zoom image frame shown in FIG. 15 is supplied as the setting information, the processing unit 122-1 performs a processing with a parameter of a candidate value number 1 with respect to the reproduction image. The processing unit 122-2 performs a processing with a parameter of a candidate value number 2 with respect to the reproduction image. The processing unit 122-3 and the processing unit 122-4 perform a processing in a similar manner. Then, the processing image after the processing (the image signal of the processing image after the processing) is supplied to the integration unit 123.

In step S63, the integration unit 123 synthesizes the processing images supplied from the respective processing units 122-1 to 122-4 so as to create a quad screen, and in step S64, the synthesis image (the image signal of the synthesis image) is output and displayed on the display apparatus 14, and the processing is returned.

Figure 16:
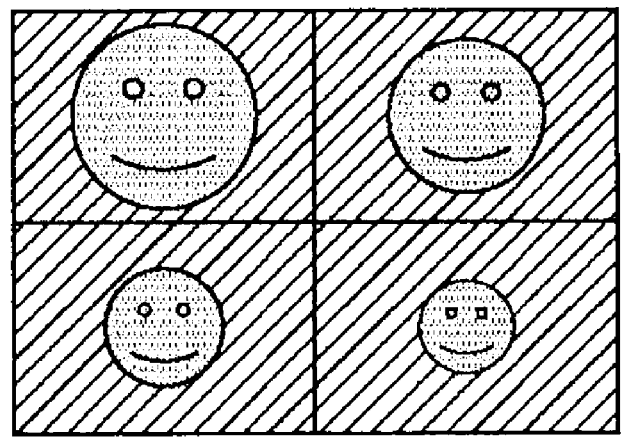
FIG. 16 illustrates an example of a synthesis image.
Figure 17:
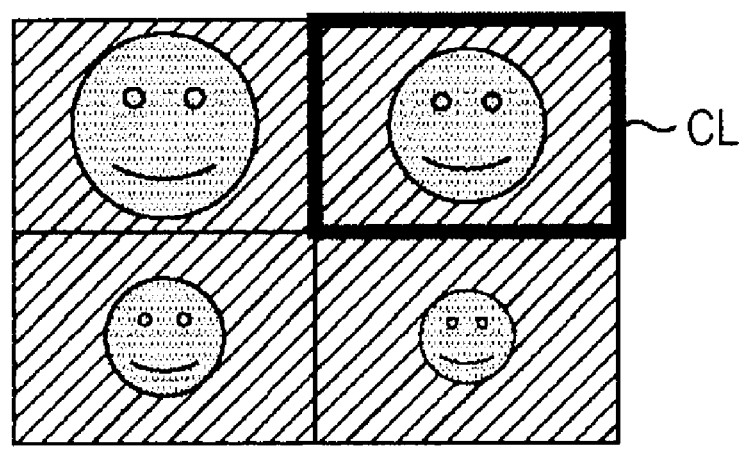
FIG. 17 illustrates an example of a screen example displayed on a display apparatus.

FIG. 16 illustrates an example of the synthesis image generated while corresponding to the four candidate values functioning as the setting information shown in FIG. 15. In addition, FIG. 17 illustrates an example of a screen displayed on the display apparatus 14. On the displayed screen, a cursor CL used for the user to perform the selection is also overlapped on the synthesis image of FIG. 16.

Figure 8:
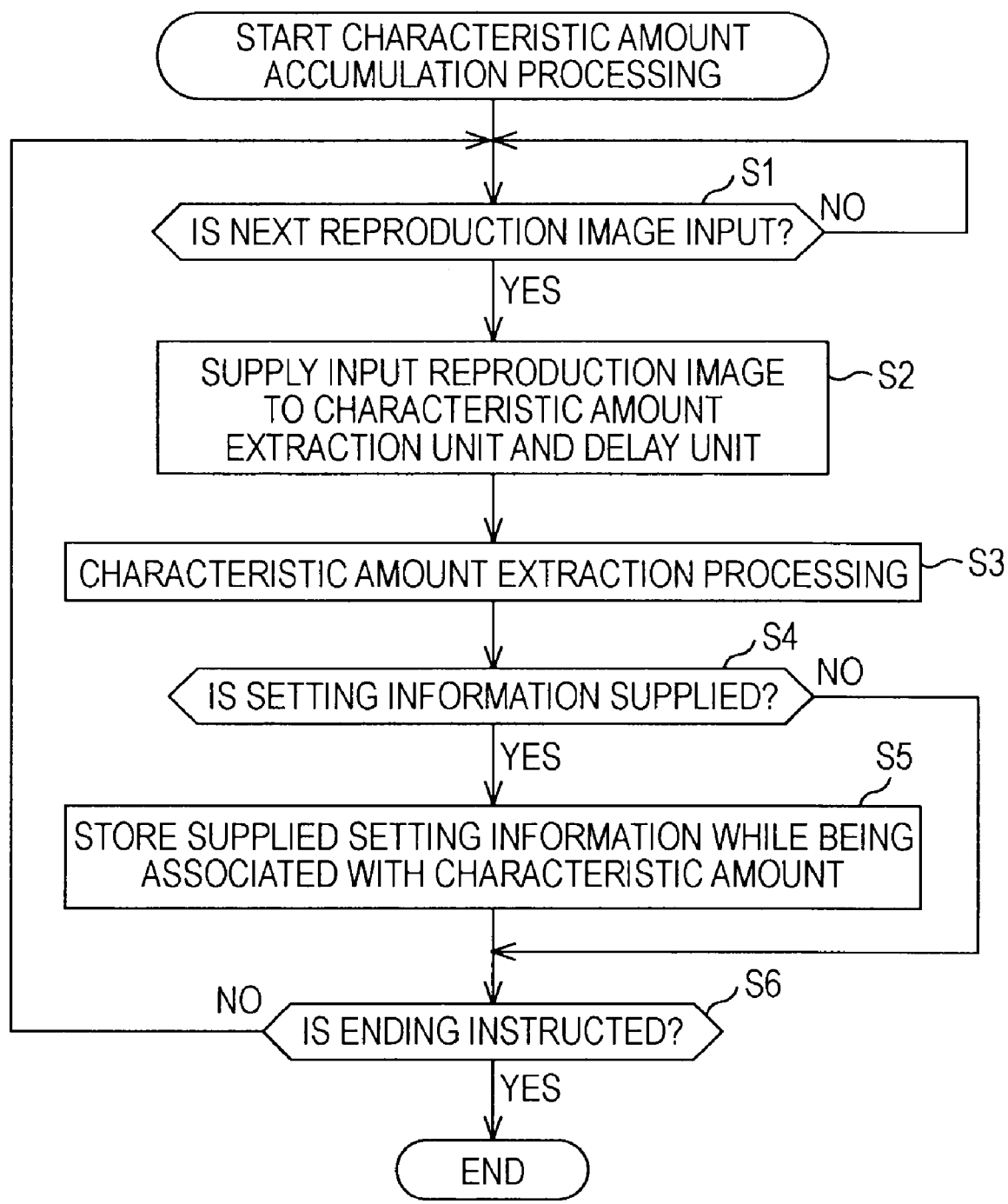
FIG. 8 is a flow chart for describing a characteristic amount accumulation processing.

As described above, in the recording mode, as the characteristic amount accumulation processing of FIG. 8 and the setting information decision processing of FIG. 11 are carried out at the same time, a parameter value optimal to the user is decided with respect to the supplied reproduction image from the reproduction apparatus 13 and is accumulated in the setting information accumulation unit 62 while being associated with the characteristic amount.

It should be noted that in the above-mentioned setting information decision processing example, regarding the respective pieces of setting information identified by the setting information type number M, optimal candidate values are regularly narrowed down from the same initial value. In the setting information decision processing for the second time and thereafter, the previously decided value may be changed as the initial value (or one the initial values).

Next, with reference to a flow chart of FIG. 18, a processing in the reproduction mode (reproduction mode processing) will be described.

First, in step S101, the image processing apparatus 11 determines whether or not the next reproduction image (the new reproduction image) is input. Until it is determined that the next reproduction image is input, the processing in step S101 is repeatedly performed. In a case where it is determined that the next reproduction image is input, the processing advances to step S102.

In step S102, the image processing apparatus 11 supplies the input reproduction image to the characteristic amount extraction unit 41 and the delay unit 47. After the delay unit 47 delays the supplied reproduction image for a predetermined period of time, the delay unit 47 supplies the reproduction image to the reflection unit 48.

In step S103, the characteristic amount extraction unit 41 performs the characteristic amount extraction processing for extracting (detecting) the characteristic amount of the supplied reproduction image. A detail of the characteristic amount extraction processing is similar to the above-mentioned processing in FIG. 9 described above, and a description thereof will be omitted.

In step S104, the synchronous detection unit 42 performs the synchronous detection processing for searching for the characteristic amount which is matched with the characteristic amount of the reproduction image (the reproduction position characteristic amount) supplied from the characteristic amount extraction unit 41 among the characteristic amounts accumulated in the setting information accumulation unit 62 (the search position characteristic amount). A detail of the synchronous detection processing will be described below with reference to FIG. 19. In a case where the characteristic amount which is matched with the characteristic amount of the reproduction image supplied from the characteristic amount extraction unit 41 exists among the characteristic amounts accumulated in the setting information accumulation unit 62, the synchronous detection unit 42 supplies the characteristic amount at the forefront position of the matching search position characteristic amount as the synchronous position information to the setting information reading unit 63.

In step S105, the setting information reading unit 63 determines whether or not the synchronous position information is supplied. In step S105, in a case where it is determined that the synchronous position information is not supplied, the processing in steps S106 to S108 is skipped.

On the other hand, in step S105, in a case where it is determined that the synchronous position information is supplied, in step S106, the setting information reading unit 63 reads the setting information which is associated with the characteristic amount supplied as the synchronous position information and which is stored the setting information accumulation unit 62 and supplies the setting information to the setting information decision unit 46.

In step S107, the setting information decision unit 46 supplies the supplied setting information as the control signal to the reflection unit 48 from the setting information reading unit 63.

In step S108, the reflection unit 48 performs the reflection processing for reflecting the supplied setting information on the reproduction image to be displayed. The detail of this processing will be described below with reference to FIG. 20.

In step S109, the image processing apparatus 11 determines whether or not ending of the operation is instructed. In step S109, in a case where it is determined that the ending of the operation is not instructed, the processing is returned to step S101, and the above-mentioned processing in steps S101 to S109 is repeatedly performed. On the other hand, in step S109, in a case where it is determined that the ending of the operation is instructed, the processing is ended.

Figure 19:
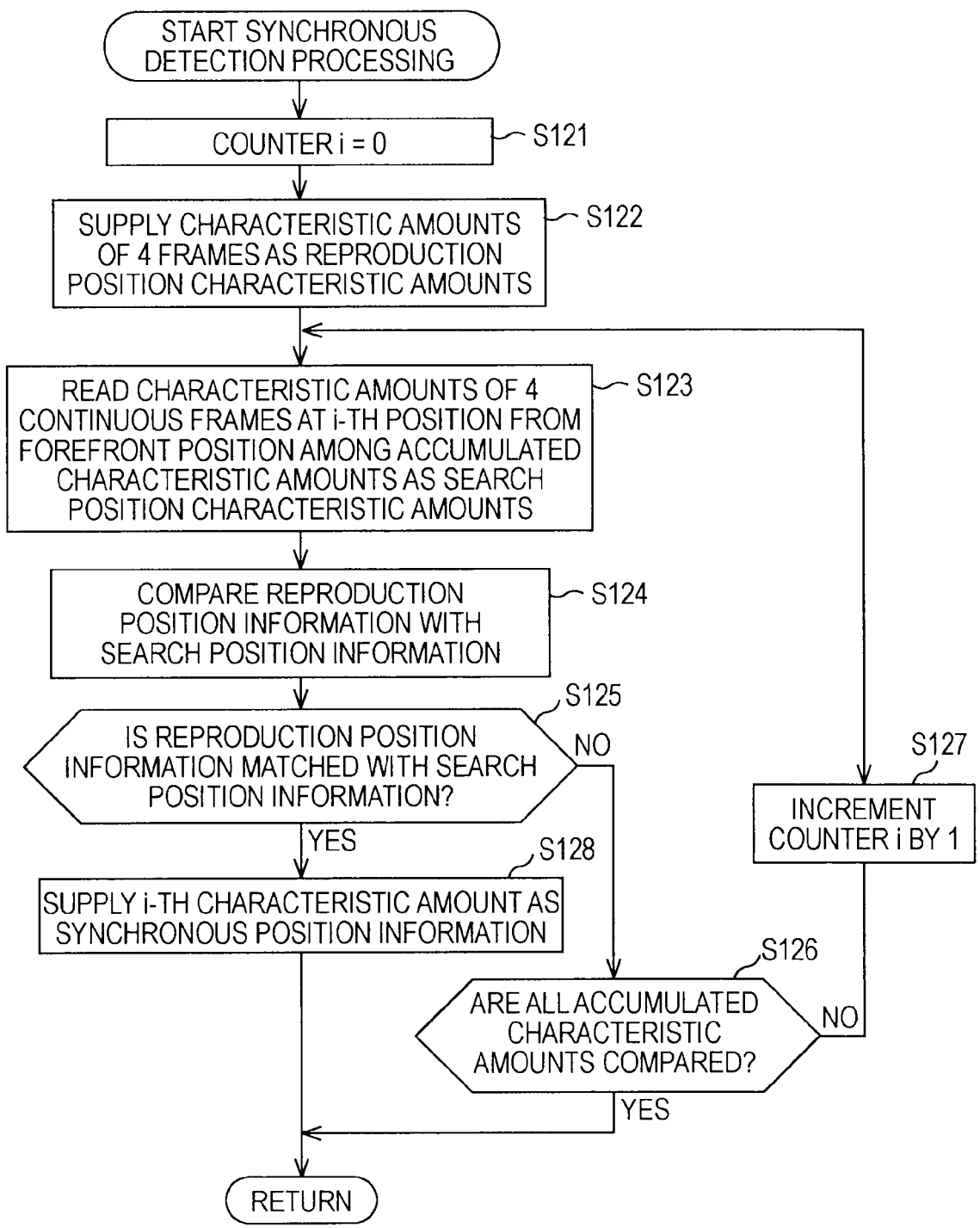
FIG. 19 is a flow chart for describing a synchronous detection processing.

With reference to a flow chart of FIG. 19, a detail of the above-mentioned synchronous detection processing in step S104 will be described.

In step S121, the search position characteristic amount reading unit 103 sets a counter i for identifying the search position as 0.

In step S122, the reproduction position characteristic amount generation unit 102 supplies the characteristic amount of the most recent four frames in which the characteristic amount of the newest frame supplied to the synchronous detection unit 42 and the characteristic amounts of the past three frames held in the characteristic amount buffers 101-1 to 101-3 are added with each other, as the reproduction position characteristic amount to the comparison unit 104.

In step S123, the search position characteristic amount reading unit 103 reads the characteristic amounts of the continuous four frames at the i-th position from the forefront position of the characteristic amounts accumulated in the setting information accumulation unit 62 as the search position characteristic amount and supplies the characteristic amounts to the comparison unit 104 and the detection unit 105.

In step S124, the comparison unit 104 compares the reproduction position characteristic amount supplied from the reproduction position characteristic amount generation unit 102 with the search position characteristic amount supplied from the search position characteristic amount reading unit 103.

In step S125, the comparison unit 104 determines whether or not the reproduction position characteristic amount is matched with the search position characteristic amount.

In step S125, in a case where it is determined that the reproduction position characteristic amount is not matched with the search position characteristic amount, the processing advances to step S126, where the comparison unit 104 determines whether or not all the characteristic amounts accumulated in the setting information accumulation unit 62 are compared with the reproduction position characteristic amount. Then, in step S126, in a case where it is determined that all the characteristic amounts are not compared, the comparison unit 104 increments the counter i by 1 in step S127, and the processing is returned to step S123. With this configuration, while the characteristic amounts accumulated in the setting information accumulation unit 62 is shifted at the one frame interval, the comparison of the search position characteristic amount composed of the characteristic amounts of the four continuous frames with the reproduction position characteristic amount is repeatedly performed.

Figure 18:
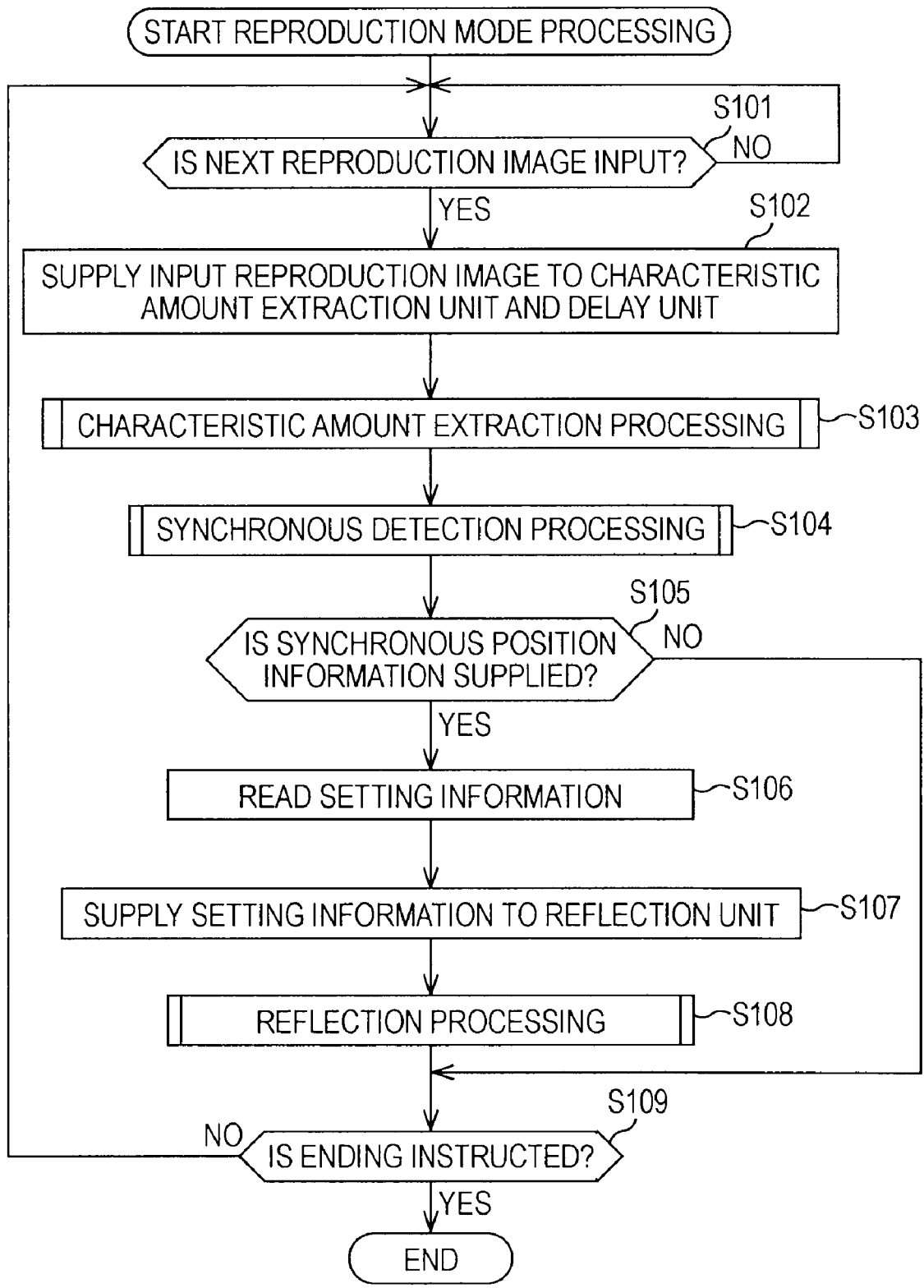
FIG. 18 is a flow chart for describing a reproduction mode processing.

On the other hand, in step S126, in a case where it is determined that all the characteristic amounts are compared, the processing is returned to FIG. 18.

On the other hand, in step S125, in a case where it is determined that the reproduction position characteristic amount is matched with the search position characteristic amount, the processing advances to step S128, where the comparison unit 104 notifies the detection unit 105 that the reproduction position characteristic amount is matched. On the basis of this notification, the detection unit 105 supplies the characteristic amount at the forefront position of the search position characteristic amount currently supplied from the search position characteristic amount reading unit 103, that is, the characteristic amount at the i-th position from the forefront position as the synchronous position information to the setting information reading unit 63, and the processing is returned to the processing in FIG. 18.

With the above-mentioned processing, it is possible to establish synchronous between the characteristic amounts accumulated in the setting information accumulation unit 62 and the characteristic amount of the reproduction image. In other words, in order to suppress the possibility that the characteristic amount is accidentally matched and the synchronous is detected at a wrong position as the synchronous detection unit 42 compares only the characteristic amount of the frame of the reproduction image with the characteristic amounts accumulated in the setting information accumulation unit 62, the comparison of the four frames including not only the characteristic amount of the currently reproduced frame but also the past three frames including the reproduced frame is performed. Thus, the synchronous detection is carried out more accurately. In addition, by using the characteristic amount in this manner, it is possible to set the characteristic amount instead of the time code in units of the respective frames. Thus, without using the time code, it is possible to carry out the synchronous detection in units of frame.

Figure 20:
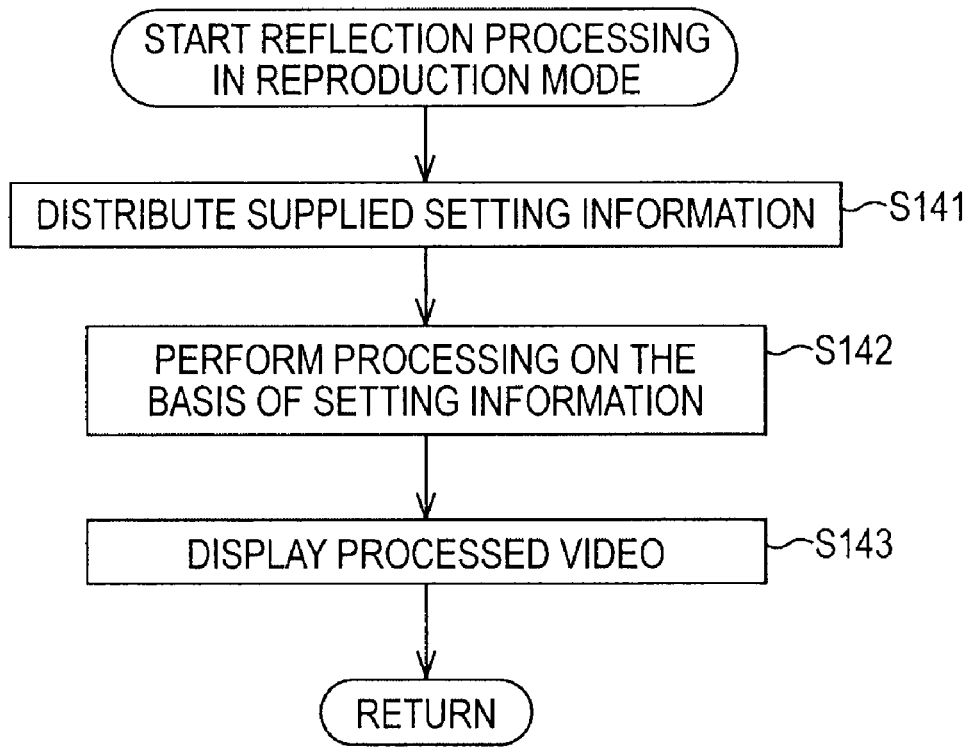
FIG. 20 is a flow chart for describing a reflection processing.

Next, with reference to a flow chart of FIG. 20, a detail of the reflection processing in step S108 of FIG. 18 will be described.

First, in step S141, the distribution unit 121 of the reflection unit 48 distributes the setting information supplied from the setting information decision unit 46. To be more specific, the distribution unit 121 supplies one candidate value supplied from the setting information decision unit 46 to the respective processing units 122-1 to 122-4. In addition, the distribution unit 121 supplies the reproduction image supplied from the delay unit 47 to the respective processing units 122-1 to 122-4.

In step S142, the respective processing units 122-1 to 122-4 perform the processing on the basis of the setting information. As the same parameter value is supplied to the respective processing units 122-1 to 122-4, the respective processing units 122-1 to 122-4 perform the same processing on the reproduction image. The respective processing units 122-1 to 122-4 supply the processing image after the processing (the image signal of the processing image after the processing) to the integration unit 123.

In step S143, the integration unit 123 outputs any one of the processing images supplied from the respective processing units 122-1 to 122-4, for example, the processing image from the processing unit 122-1 (the image signal of the processing image) as it is to the display apparatus 14, and the processing image is displayed.

Figure 21:
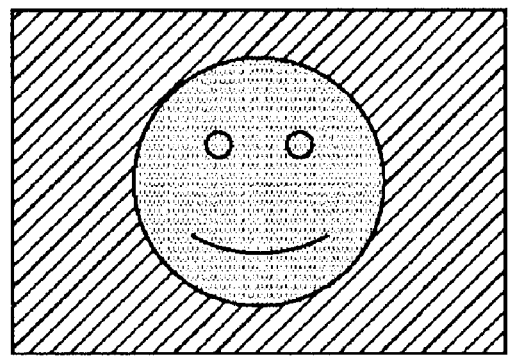
FIG. 21 illustrates a display example in a reproduction mode.

FIG. 21 illustrates a processing image example displayed on the display apparatus 14 in the reproduction mode.

For example, in the recording mode, in a case where the processing image is selected by the cursor CL in FIG. 17 from the processing images corresponding to the parameter values of the four types of the zoom image frames shown in FIG. 15, that is, the parameter value of the candidate number 3 is selected, in the reproduction mode also, by establishing the synchronous at the characteristic amount of the reproduction image, for the same image, the processing image in which the processing is performed with the parameter value of the candidate number 3, that is, the zoom center coordinate (300, 600) and the zoom factor 250%, is displayed.

As described above, in the reproduction mode, when the same characteristic amount as the characteristic amounts accumulated in the setting information accumulation unit 62 is detected from the reproduction image, the setting information stored in the setting information accumulation unit 62 while being associated with the detected characteristic amount is used to apply the processing on the reproduction image. The processing image obtained by performing the processing on the reproduction image with the parameter value selected by the user to be determined as the optimal value in the recording mode can be reproduced and displayed.

It should be noted that according to the above-mentioned reproduction mode processing, the characteristic amount associated with the setting information is not accumulated in the setting information accumulation unit 62 for all the reproduction images (the frames of all the reproduction images). Thus, until the next characteristic amount is detected, the processing image (keeping) using the previously set setting information is displayed, but for all the reproduction images, the characteristic amounts and the setting information may be accumulated in the setting information accumulation unit 62, and the setting information may be read out for each frame to apply the processing and display the processing image. In this case, in the recording mode, in a case where it is determined that the setting information is not supplied in step S4 of the characteristic amount accumulation processing of FIG. 8, the current setting information may be stored in the setting information accumulation unit 62 while being associated with the characteristic amount supplied from the characteristic amount extraction unit 41.

Incidentally, according to the above-mentioned embodiment, in the recording mode, the order in which the plural pieces of setting information are decided by the user, that is, the order of the setting information decided by the user is fixed on the basis of the setting information table stored by the setting information decision unit 46 (the order of the setting information type number M in the setting information table) as shown in FIG. 12.

However, depending on a type of the setting information, a correlation is regarded to exist between the parameters as properties of the parameters are similar to each other. If a certain parameter is decided, another parameter can be estimated in some cases, for example.

The decision of the parameter optimal value is a fundamental part of the user interface unit, and how easily the user decides the optimal value for the parameter is important.

In view of the above, in the image processing apparatus 11, various presentation methods which will be shown below can be adopted so that the plural types of the setting information (parameters) shown in FIG. 12 can be decided by the user.

Figure 22:
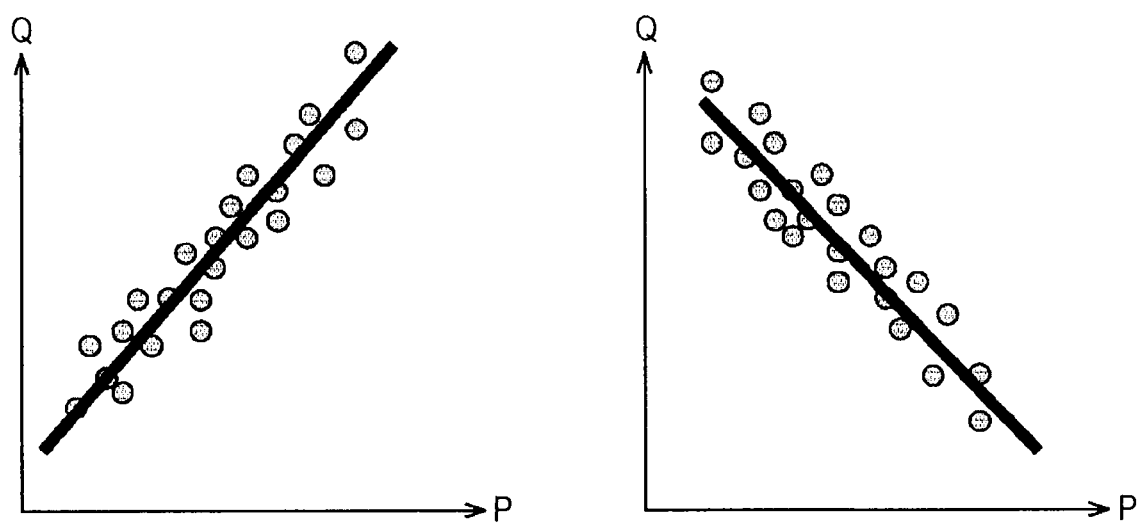
FIG. 22 illustrates an example of two parameters with a strong correlation.

For example, if a predetermined parameter P and a predetermined parameter Q are respectively decided by the user through a plurality of narrowing down operations, in a case where the strong correlation exists between the final parameter values for the parameter P and the parameter Q as shown in FIG. 22, when the parameter P is decided by the user, by obtaining the parameter Q from the correlation between the parameter P and the parameter Q, the user can omit the selection of the parameter Q.

To be precise, in a case where an absolute value of a correlation coefficient r for the parameter P and the parameter Q is sufficiently large and a relational expression Q=f(P) can be derived from the least-square method, etc., when an optimal value P' for the parameter P is decided, the image processing apparatus 11 obtains the optimal value Q' for the parameter Q from Q'=f(P'), and the user can omit the selection of the parameter Q. Alternatively, the value Q' for the parameter Q obtained through Q'=f(P') is not directly set as the optimal value, and in a processing for selecting the optimal value for the parameter Q, the presented initial value may be set as the parameter Q'. In this case, as the number of the narrowing down operations for the user to decide the optimal value for the parameter Q is reduced, it is possible to perform the setting more easily.

In some cases, an absolute value of the correlation coefficient r for the parameter P and the parameter Q is relatively large, but the analogical application from the other parameter is not yet performed, and after the parameter is adjusted, a trade off relation exists where the other parameter should be readjusted. To be more specific, in some cases, after the parameter values are adjusted in the order of the parameter P and the parameter Q, due to an influence from the change in the value for the parameter Q, the value for the parameter P should be readjusted.

In such a case, the image processing apparatus 11 can suppress the readjustment as the user performs an adjustment with a value after an axis of a parameter to be adjusted is converted. To be precise, as shown in FIG. 23, with regard to a relation between the parameter P and the parameter Q, the image processing apparatus 11 obtains a relational expression Q=f(P) through the least-square method or the like, and derives an axis R which is parallel to the thus obtained relational expression and an axis S which is perpendicular to the axis R. Then, the image processing apparatus 11 allows the user to adjust values for a parameter R and a parameter S instead of the values for the parameter P and the parameter Q. The axis R and the axis S have a relatively small correlation. After a rough adjustment is performed by the axis R, a fine adjustment by the axis S. Therefore, without performing a readjustment, it is possible to decide the optimal values for the parameters. In addition, as a value range for the axis S is narrow, the narrowing down for the optimal values is facilitated.

Next, the user is thought to perform a similar setting on similar types of the parameters. Thus, it is considered that if the settings on the parameters having a strong correlation are continuously performed, the optimal values can be set more easily.

Figure 24:
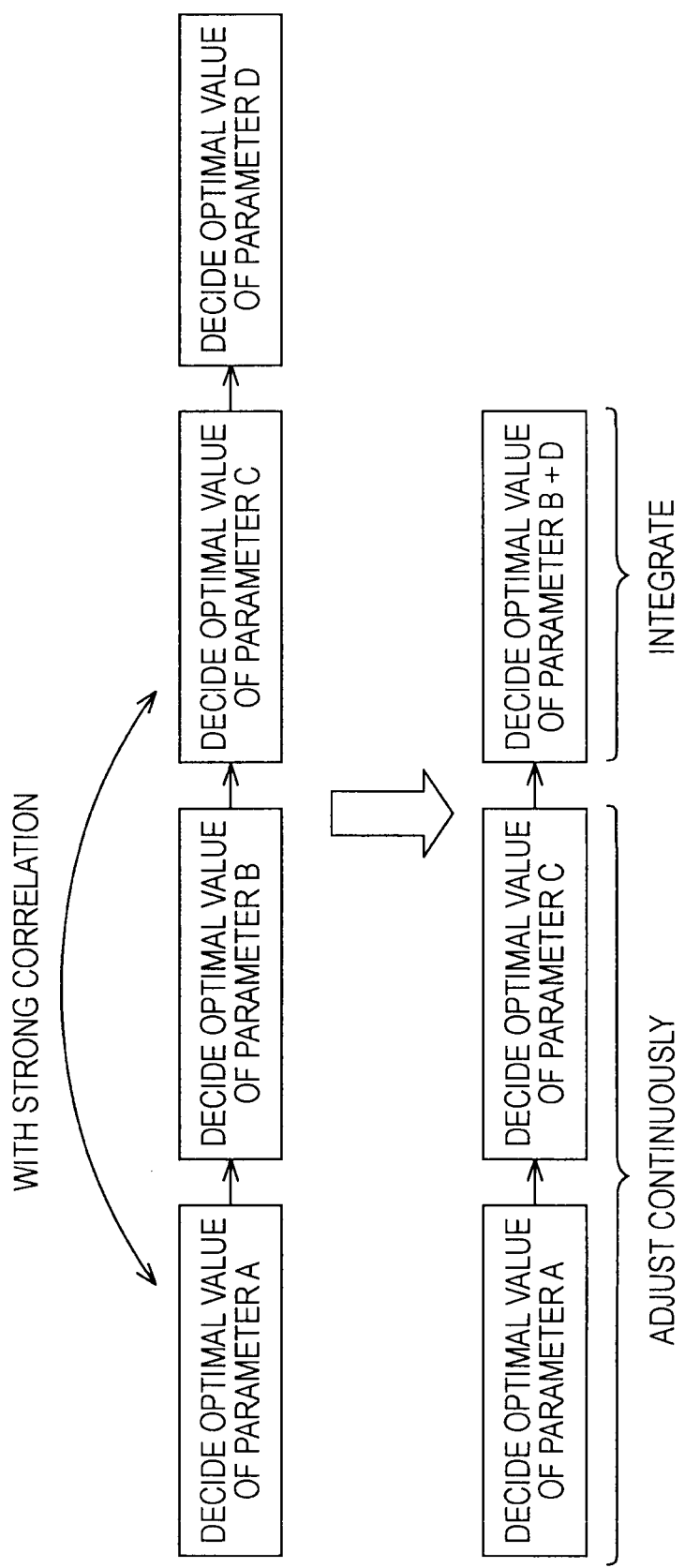
FIG. 24 illustrates a shuffling of a presentation order of the parameters.

In view of the above, as shown in the upper stage of FIG. 24, in the original presentation order, parameters are adjusted by the user in the order of a parameter A, a parameter B, a parameter C, and a parameter D. In a case where the parameter A and the parameter C have a strong correlation, the image processing apparatus 11 switches the presentation order of the parameter B and the parameter C as shown in the lower stage of FIG. 24 to present the parameter A and the parameter C in the stated order. That is, it is possible to continuously adjust the parameter A and the parameter C which have the correlation. It should be noted that in FIG. 24, in the "optimal value decision of the parameters B+D", as the parameter B and the parameter D also have a strong correlation. In a case where the parameter B is decided by using the above-mentioned relational expression D=f(B), the value for the parameter D is also decided on the basis of the value for the parameter B.

Figure 25:
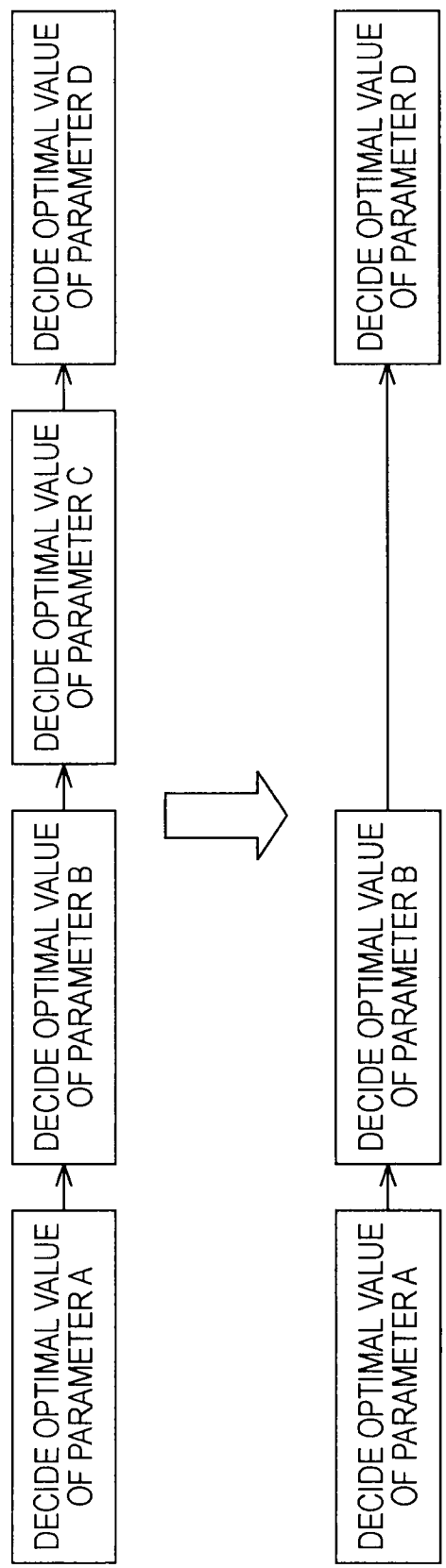
FIG. 25 illustrates an omission of parameters.

Also, the image processing apparatus 11 can also omit the adjustment of the parameters with regard to the parameters whose values are not changed in the past parameter settings or whose values are not changed for a predetermined period of time. For example, as shown in FIG. 25, in a case where the value for the parameter C is not changed by the user thus far among the parameter A, the parameter B, the parameter C, and the parameter D, the adjustment on the parameter C is not performed, and the adjustment only on the parameter A, the parameter B, and the parameter D can be performed.

Furthermore, although a causal association is not obvious, depending on presentation orders for the parameters, the number of steps (the period of time, the number of operations, and the like) are changed until all the optimal values for the parameters are finally decided in some cases. In view of the above, the image processing apparatus 11 switches the presentation orders for the parameters for the presentation as occasion demands and counts the number of steps (end step number) until all the parameters at that time are decided. Thus, it is possible to set such a presentation order in which all the parameters can be decided with a smaller number of end step number.

Figure 26:
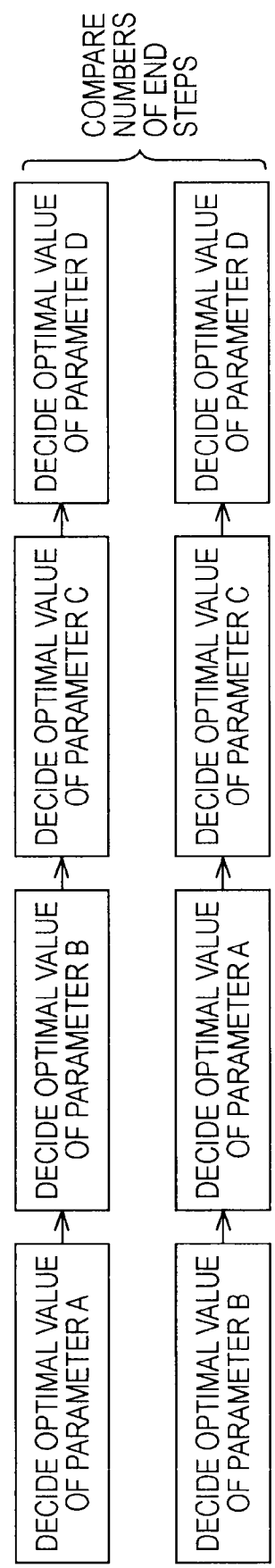
FIG. 26 is an explanatory diagram for describing a comparison of the presentation orders in terms of the number of ending steps.

For example, as shown in the upper stage of FIG. 26, the number of steps when the user performs the adjustment in the order of the parameter A, the parameter B, the parameter C, and the parameter D is total 40 steps composed of 10 steps, 20 steps, 5 steps, and 5 steps. As shown in the lower stage of FIG. 26, the number of steps when the user performs the adjustment in the order of the parameter B, the parameter A, the parameter C, and the parameter D is total 45 steps composed of 5 steps, 10 steps, 15 steps, and 15 steps. In that case, the image processing apparatus 11 can allow the user to perform the adjustment in the order of the parameter A, the parameter B, the parameter C, and the parameter D with the small end step number as shown in the upper stage of FIG. 26. Such a change is not commonly used for any users but is effective in the case of a large degree of dependence on the user such as the correlation between the parameters.

Also, speaking of differences among individuals related to the parameter adjustments, some users prefer an adjustment pattern in which the respective parameters are strictly adjusted, and thereafter the next adjustment of the parameters is performed, and other users prefer another adjustment pattern in which all of the respective parameters are roughly adjusted, and again, the final strict adjustment is performed for each of the parameters. In view of the above, the image processing apparatus 11 records the past adjustment patterns of the respective users. In the adjustment to be performed next time and thereafter, it is also possible to present a candidate value for the parameter in an adjustment pattern preferred by the user. For example, an average value of the number of the continuous candidate selection operations for the respective parameters is obtained. In a case where the average value is equal to or larger than a predetermined value, it is decided that the former adjustment pattern is preferred by the user, and in a case where the average value is smaller than the predetermined value, it is decided that the latter adjustment pattern is preferred by the user. It should be noted that in the adjustment pattern in which all of the respective parameters are roughly adjusted, and again, the final strict adjustment is performed for each of the parameters, the processing image using a value used for the rough adjustment as the initial value for the stage where the strict adjustment is performed should be presented.

As described above, in the image processing apparatus 11, the typical tendency of the past operation procedure until the user decides the optimal value for the parameter is extracted, and the operation procedure for performing the adjustment of the parameters next time in accordance with the characteristic is changed. Thus, the operation procedure can be simplified or changed, and it is possible for the user to decide the optimal value for the parameter simply or in a short period of time. That is, in the image processing apparatus 11, by changing the operation procedure for the parameter adjustment while being specialized to the user, it is possible to reduce the labor hour of the user.

Figure 27:
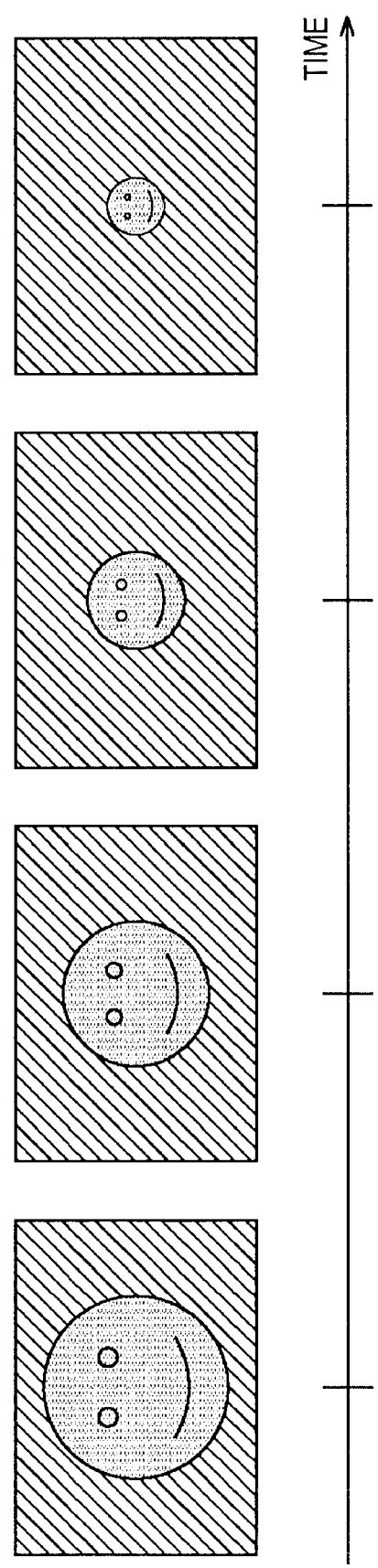
FIG. 27 illustrates a display example of a time division display.

Next, a case will be described in which in the recording mode, instead of presenting a plurality of processing images on the division screen display, the processing images are presented in a time division manner. In the time division display, for example, in an example of the parameter of the zoom image frame, as shown in FIG. 27, the processing images corresponding to the four types of the different parameters are repeatedly displayed at a predetermined time interval in a predetermined order.

Figure 28:
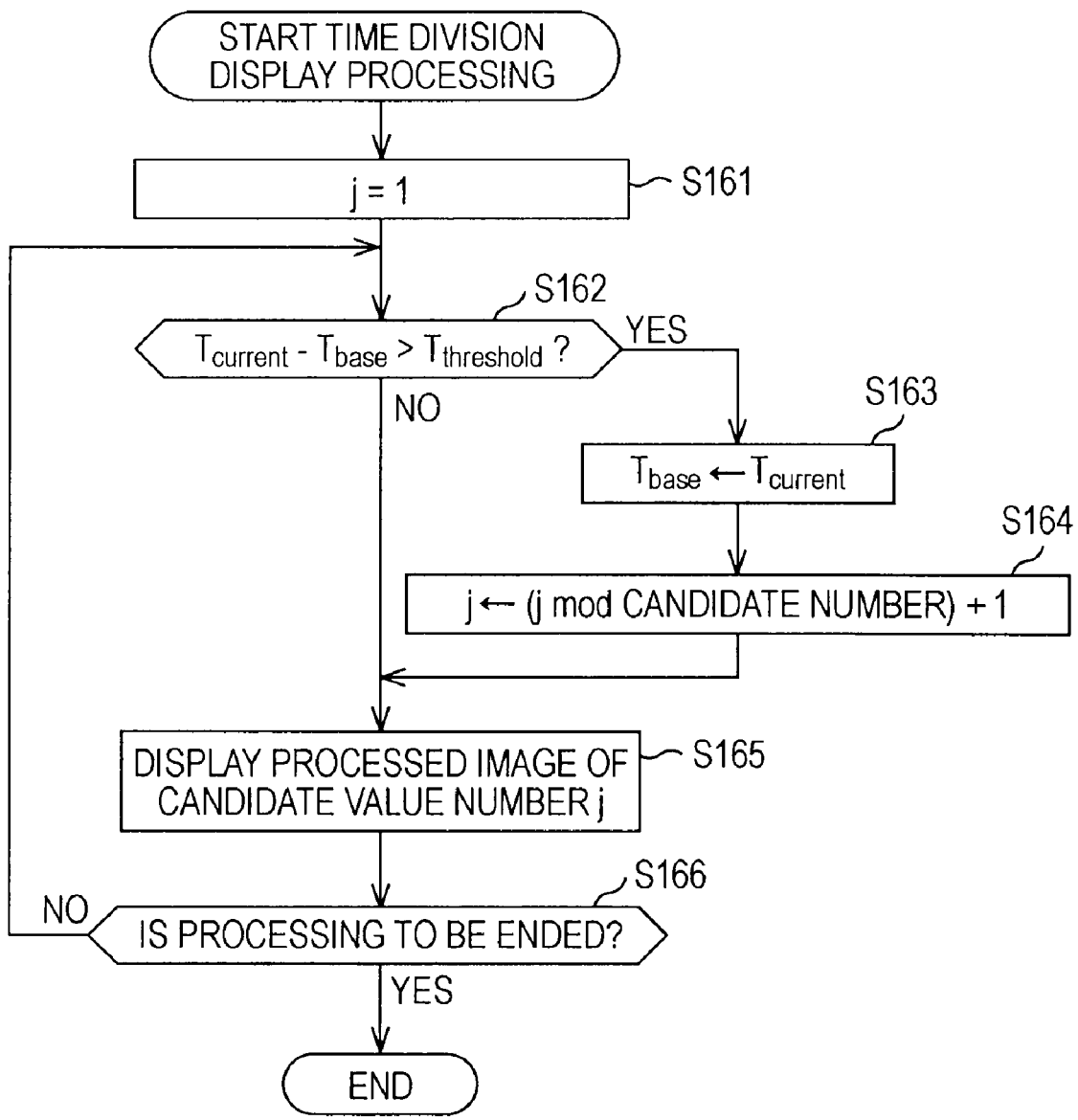
FIG. 28 is a flow chart for describing a time division display processing.

FIG. 28 is a flow chart for the time division display processing performed in the integration unit 123 of the reflection unit 48.

First, in step S161, the reflection unit 48 sets a variant j for identifying the candidate number corresponding to the processing image displayed on the display apparatus 14 as 1.

In step S162, the integration unit 123 displays the processing image of the candidate number j to determine whether or not a predetermined period of time, in other words, a difference between a current time $T_{current}$ and a base time $T_{base}$ ($T_{current}-T_{base}$) exceeds a display time $T_{threshold}$ for displaying the processing image once.

In step S162, in a case where it is determined that the predetermined period of time elapses since the processing image of the candidate number j is displayed, in step S163, the integration unit 123 substitutes the current time $T_{current}$ for the base time $T_{base}$. In step S164, a value obtained by adding 1 to a remainder of a division of the current candidate number j by the number of the candidate values (candidate number) ((j mod candidate number)+1) is set as a new candidate number j.

In step S162, in a case where it is determined that the predetermined period of time does not elapse since the processing image of the candidate number j is displayed, or after the processing in step S164, in step S165, the integration unit 123 displays the processing image subjected to the processing with the parameter value of the candidate number j.

In step S166, the integration unit 123 determines whether or not the processing is to be ended. In step S166, in a case where it is determined that the processing is not to be ended, the processing is returned to step S162, and the processing thereafter is repeatedly performed. On the other hand, in step S166, in a case where it is determined that the processing is to be ended, that is, in a case where the recording mode is ended or the operation for turning OFF the power source of the image processing apparatus 11 is performed, for example, the time division display is ended.

As described above, with the image processing apparatus 11, it is possible to perform the complex editing such as adjustments on the zoom frame and the image quality as the user performs the simple operation for selecting the desired processing image while the plurality of processing images displayed on the display apparatus 14 are visually compared with one another. That is, it is possible to realize the sophisticated linear editing through the simple operation.

Figure 29:
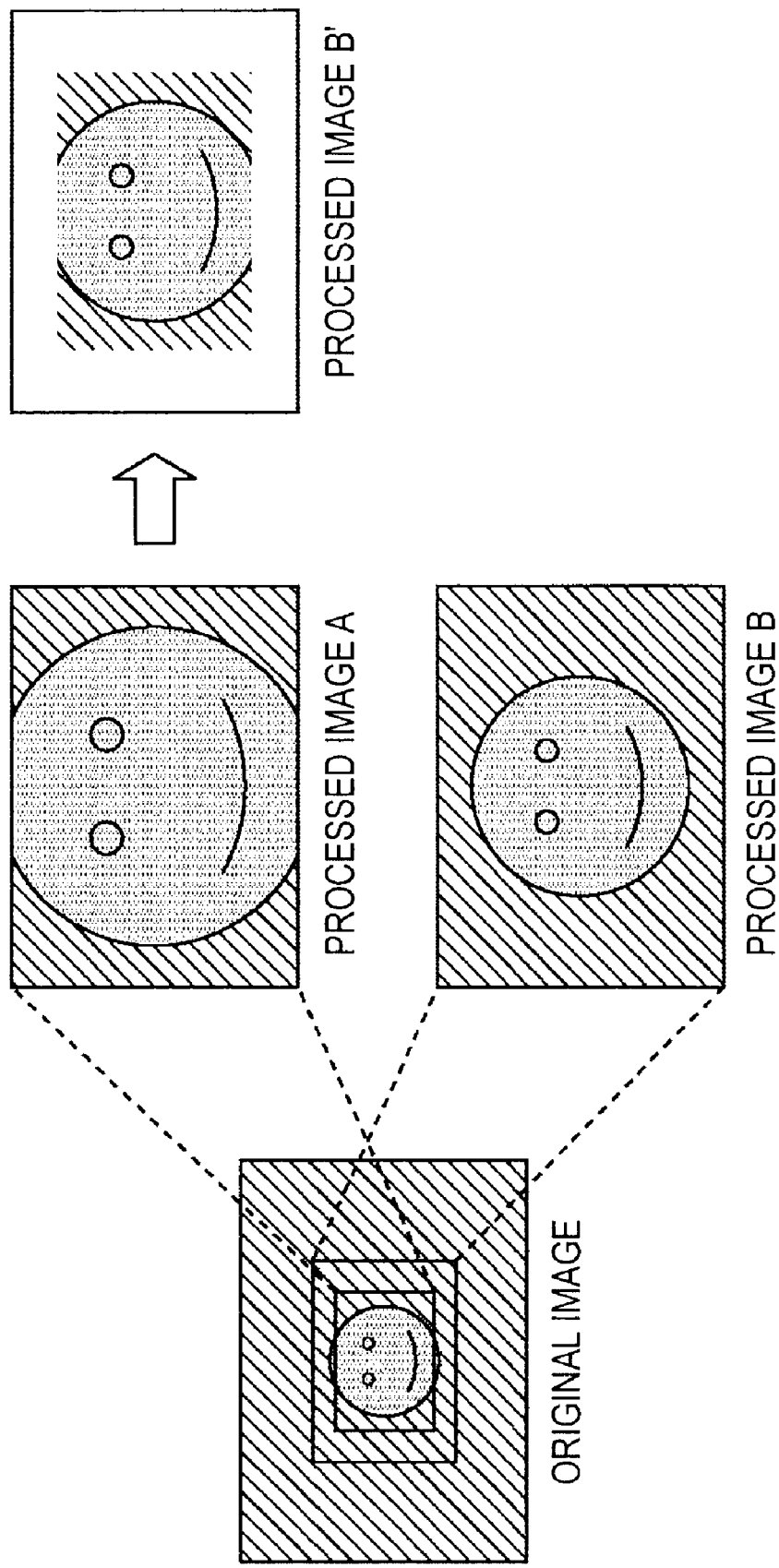
FIG. 29 is an explanatory diagram for describing a problem in an editing processing in a related art.

In the editing processing in the related art, after the temporary processing image is generated, if a further processing is intended to be applied, there is a problem, for example, that the information is missing and reprocessing is difficult to perform. For example, as shown in FIG. 29, it is of course possible to perform the zoom processing on the original image to have a state of a processing image B, but once the zoom processing is performed on the original image to have a state of a processing image A, and thereafter a too high zooming factor is set. When the processing image B is desired to be created by setting a slightly smaller zooming factor, only a processing image B' in which the information is missing can be generated from the processing image A, and it is difficult to generate the processing image B. In this way, in the editing processing in the related art, a restriction exists when the processings are accumulated. On the other hand, in the image processing apparatus 11, the original image is not touched, and the editing operation can be cancelled or redone in an interactive manner, and it is possible to easily accumulate the processings.

Furthermore, as described above with reference to FIG. 2, the processing image which is processed with the parameter selected as the optimal value by the user is not stored, but only the setting information (the parameter) corresponding to the characteristic amount is stored, and there is therefore an effect that it is possible to reduce the memory volume.

The present applicant proposes an image processing apparatus for presenting a plurality of processing images with different processing parameters in a screen division or time division manner and selecting an optimal parameter by comparing a plurality of processing images with one another in Japanese Patent Application No. 2007-187879 or Japanese Patent Application No. 2007-187880. According to the method proposed in Japanese Patent Application No. 2007-187879 or Japanese Patent Application No. 2007-187880, the proposed value for the parameter is prepared in advance. Therefore, it is troublesome to prepare the variation of the presentation candidates (candidates of the processing image), and also the presentation candidates may not actually include the image desired by the user. In some cases, it is difficult to realize the editing satisfied by the user. In addition, there is no processing for specializing and changing the operation procedure for the parameter adjustment to the user.

In the image processing apparatus 11, as the initial value is decided from the value range of the parameter, and the parameter is narrowed down in accordance with the candidate value selected by the user. It is therefore possible to set the value desired by the user. Also, as described above, the operation procedure for the parameter adjustment can be specialized and changed to the user.

It should be noted that in the above-mentioned example, the case has been described where in the recording mode, the number of the processing images to be presented is 4, but the number of the processing images to be presented may be 2 or 3, or 5 or more.

The above-mentioned series of processings can be executed by way of hardware or also executed by way of software. In a case where the series of processings is executed by way of the software, a program constituting the software is installed from a program recoding medium into a computer incorporated in dedicated-use hardware or a general-use personal computer capable of executing various functions, for example, by installing various programs.

FIG. 30 is a block diagram of a hardware configuration example of a computer configured to execute the above-mentioned series of processings by way of a program.

In the computer, a CPU (Central Processing Unit) 201, a ROM (Read Only Memory) 202, and a RAM (Random Access Memory) 203 are mutually connected via a bus 204.

Furthermore, an input and output interface 205 is connected to the bus 204. To the input and output interface 205, an input unit 206 composed of a key board, a mouse, a micro phone, and the like, an output unit 207 composed of a display, a speaker, and the like, a storage unit 208 composed of a hard disk, a non-volatile memory, and the like, a communication unit 209 composed of a network interface and the like, a drive 210 for driving a removal media 211 such as a magnetic disk, an optical disk, an opto-magnetic disk, or a semiconductor memory are connected.

In the computer constructed as described above, the CPU 201 loads, for example, a program stored in the storage unit 208 via the input and output interface 205 and the bus 204 onto the RAM 203 for execution, so that the above-mentioned series of processings is carried out.

The program executed by the computer (the CPU 201) is provided while being recorded, for example, on the removal media 211 which is a package media composed of a magnetic disk (including a flexible disk), an optical disk (CD-ROM (Compact Disc-Read Only Memory), DVD (Digital Versatile Disc), or the like), an opto-magnetic disk, a semiconductor memory, or the like, or provided via a wired or wireless transmission medium such as a local area network, the internet, or digital satellite broadcasting.

It should be noted that the program executed by the computer may be a program in which the processings are performed in a time series manner in the order described in the present specification, or a program in which the processings are performed in parallel or at a desired timing when a call is performed, for example.

In the present specification, the steps described in the flow charts of course include the processings performed in a time series manner in the stated order and also processings executed in parallel or individually instead of being executed in a time series manner.

It should be noted that in the present specification, the system represents an entire apparatus composed of a plurality of apparatuses.

The embodiments of the present invention are not limited to the above-mentioned embodiments.

The present application contains subject matter related to that disclosed in Japanese Priority Patent Application JP 2008-126958 filed in the Japan Patent Office on May 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a characteristic amount extraction unit configured to extract a characteristic amount of an image;
a generation unit configured to generate a plurality of different values for one parameter of a processing applied on the image;
a presentation unit configured to present a plurality of processing images obtained by performing a processing on the image with the plurality of different values for the parameter;
a selection unit configured to select an optimal one of the plurality of presented processing images, wherein a final value for the parameter is decided by repeatedly performing such a procedure that the generation unit further generates a plurality of different values for the parameter on the basis of a value for the parameter corresponding to the processing image selected by the selection unit, the repeatedly performing using a minimum and a maximum value of a repeated N-th time, the presentation unit presents a plurality of processing images obtained by performing a processing on the image with the plurality of generated different values for the parameter, and the selection unit selects an optimal one of the plurality of presented processing images;

and a storage unit configured to store the decided final value for the parameter as setting information while associating the setting information with the characteristic amount of the image.

2. The image processing apparatus according to claim 1, wherein in a case where the number of presentations of the processing images is n, the generation unit set values at borders obtained dividing a predetermined range into n−1 equal parts while using the value for the parameter corresponding to the processing image selected by the selection unit as a center value, as a plurality of different values for the new parameter.

3. The image processing apparatus according to claim 2, wherein the generation unit generates plural types of the parameters and changes an order of generating the plural types of the parameters in accordance with a tendency of a past operation procedure carried out by a user.

4. The image processing apparatus according to claim 1, further comprising:

setting information reading unit configured to read the setting information stored while being associated with the extracted characteristic amount of the image from the storage unit, wherein the image processing apparatus has a recording mode and a reproduction mode, in the recording mode, the storage unit stores setting information while being associated with the characteristic amount of the image, and in the reproduction mode, the characteristic amount extraction unit extracts the characteristic amount of the image, the setting information reading unit reads the setting information stored while being associated with the extracted characteristic amount of the image from the storage unit, and the presentation unit presents the processing images obtained by performing a processing on the image by using the read setting information.

5. An image processing method for an image processing apparatus including a generation unit, a presentation unit, and a selection unit, the image processing method comprising:

extracting a character amount of an image;

generating a plurality of different values for one parameter of a processing applied on the image in the generation unit;

presenting a plurality of processing images obtained by performing a processing on the image with the plurality of different values for the parameter in the presentation unit;

selecting an optimal one of the plurality of presented processing images in selection unit, wherein a final value for the parameter is decided by repeatedly performing such a procedure that the generation unit further generates a plurality of different values for the parameter on the basis of a value for the parameter corresponding to the processing image selected by the selection unit, the repeatedly performing using a minimum and a maximum value of a repeated N-th time, the presentation unit presents a plurality of processing images obtained by performing a processing on the image with the plurality of generated different values for the parameter, and the selection unit selects an optimal one of the plurality of presented processing images;

and storing, in a storage unit, the decided final value for the parameter as setting information while associating the setting information with the characteristic amount of the image.

* * * * *